(12) United States Patent
Chamami

(10) Patent No.: US 12,520,779 B2
(45) Date of Patent: Jan. 13, 2026

(54) SYSTEM FOR SATURATING A MEDIUM

(71) Applicant: GROWOP WORLD LTD., Tel Aviv (IL)

(72) Inventor: Ziv Chamami, Tel Aviv (IL)

(*) Notice: Subject to any disclaimer, the term of this patent is extended or adjusted under 35 U.S.C. 154(b) by 344 days.

(21) Appl. No.: 17/715,088

(22) Filed: Apr. 7, 2022

(65) Prior Publication Data
US 2022/0322623 A1 Oct. 13, 2022

Related U.S. Application Data

(60) Provisional application No. 63/306,118, filed on Feb. 3, 2022.

(30) Foreign Application Priority Data

Apr. 11, 2021 (IL) .......................................... 282247

(51) Int. Cl.
*A01G 27/00* (2006.01)

(52) U.S. Cl.
CPC ......... *A01G 27/003* (2013.01); *A01G 27/005* (2013.01); *A01G 27/008* (2013.01)

(58) Field of Classification Search
CPC .............................. A01G 27/00; A01G 27/003
See application file for complete search history.

(56) References Cited

U.S. PATENT DOCUMENTS

| | | | | |
|---|---|---|---|---|
| 1,753,424 A * | 4/1930 | Lanternier | ............ | A01G 27/00 141/26 |
| 2,583,276 A * | 1/1952 | Patnode | ............... | G01N 33/241 324/427 |
| 3,168,797 A * | 2/1965 | Patassy | ................ | A01G 27/003 47/79 |
| 3,437,241 A * | 4/1969 | Pei | ........................ | A01G 27/003 222/650 |
| 3,696,827 A * | 10/1972 | Sterlich | ................ | A01G 27/003 47/79 |
| 3,786,598 A * | 1/1974 | Stadelhofer | ............ | A01G 27/04 47/81 |
| 4,056,899 A * | 11/1977 | Close | ..................... | A01G 27/00 47/79 |
| 4,060,934 A | 12/1977 | Skaggs | | |

(Continued)

FOREIGN PATENT DOCUMENTS

| CN | 204482571 U | | 7/2015 | |
|---|---|---|---|---|
| CN | 105165567 A | * | 12/2015 | ............. A01G 27/00 |

(Continued)

OTHER PUBLICATIONS

Merged translation of FR_2572251 (Year: 1986).*

(Continued)

*Primary Examiner* — Morgan T Jordan

(57) ABSTRACT

A fluid dispensing device using only gravity to provide fluid to plant growing medium, for example soil, to the point of either saturation or field capacity. The fluid dispensing device may comprise a mechanism to cease supply of fluid when a threshold amount of fluid in a plant growing medium is detected. The fluid dispensing device may be used to calculate field capacity of different soils. The invention further discloses a gravity powered device for irrigating an area evenly and at a constant rate of irrigation.

13 Claims, 34 Drawing Sheets

(56) References Cited

U.S. PATENT DOCUMENTS

| | | | | |
|---|---|---|---|---|
| 4,183,175 | A * | 1/1980 | Magee | A01G 27/00 47/79 |
| 4,216,623 | A * | 8/1980 | Silver | A01G 27/02 47/80 |
| 4,285,164 | A * | 8/1981 | Moore | A01G 9/16 47/84 |
| 4,679,422 | A * | 7/1987 | Rubin | G01N 15/0826 73/38 |
| 4,760,666 | A | 8/1988 | Han | |
| 4,937,972 | A * | 7/1990 | Freitus | A01G 27/005 47/79 |
| 5,009,032 | A * | 4/1991 | Hogue | A01G 27/003 47/79 |
| 5,020,261 | A | 6/1991 | Lishman | |
| 5,209,015 | A * | 5/1993 | De Filippi | A01G 27/003 47/79 |
| 5,596,839 | A * | 1/1997 | Ellis-El | A01G 27/06 47/79 |
| 5,678,600 | A * | 10/1997 | Locke | A01G 27/00 137/414 |
| 5,782,035 | A * | 7/1998 | Locke | A01G 27/00 47/79 |
| 6,289,725 | B1 * | 9/2001 | Hubbell | G01N 15/08 141/47 |
| 6,497,071 | B1 * | 12/2002 | Main | A47G 33/12 47/79 |
| 6,516,563 | B1 * | 2/2003 | Matthews | A01G 9/02 47/79 |
| 6,532,803 | B2 * | 3/2003 | Hutchinson | G01N 33/246 73/73 |
| 6,622,430 | B1 * | 9/2003 | Lai | A01G 27/02 47/79 |
| 6,729,070 | B1 * | 5/2004 | Locke | A01G 27/00 47/79 |
| 6,978,575 | B1 * | 12/2005 | Bradley | A01G 27/003 47/66.1 |
| 7,131,317 | B2 * | 11/2006 | Lenormand | G01N 15/0826 73/38 |
| 7,367,218 | B2 * | 5/2008 | Zornberg | G01N 15/08 73/38 |
| 7,921,865 | B2 * | 4/2011 | Balet | A01G 25/167 47/79 |
| 8,806,954 | B1 * | 8/2014 | Hubbell | G01F 1/00 73/863.23 |
| 9,295,204 | B2 * | 3/2016 | Nguyen | A01G 25/16 |
| 9,565,811 | B2 * | 2/2017 | Tsai | A01G 31/02 |
| 10,091,951 | B2 * | 10/2018 | Kaminski | A01G 9/02 |
| 2002/0088177 | A1 * | 7/2002 | Gergek | A01G 27/003 47/79 |
| 2002/0134011 | A1 * | 9/2002 | Astle | A01G 27/00 47/48.5 |
| 2004/0195372 | A1 * | 10/2004 | Yoshikawa | A01G 27/003 239/310 |
| 2005/0115149 | A1 * | 6/2005 | Tanaka | A01G 27/003 47/79 |
| 2007/0157512 | A1 * | 7/2007 | Wein | G01N 27/225 137/78.3 |
| 2009/0000189 | A1 * | 1/2009 | Black | A01G 9/023 47/82 |
| 2009/0038221 | A1 * | 2/2009 | Poore, Jr. | A01G 27/003 340/602 |
| 2009/0056219 | A1 * | 3/2009 | Csoke | A01G 27/02 47/79 |
| 2009/0223127 | A1 * | 9/2009 | Brown | A01G 27/003 47/79 |
| 2009/0288342 | A1 * | 11/2009 | Hui | A01G 27/06 47/79 |
| 2010/0064581 | A1 * | 3/2010 | Johnson | A01G 27/008 47/79 |
| 2011/0162273 | A1 * | 7/2011 | Mittelmark | B01D 53/84 47/79 |
| 2011/0179708 | A1 * | 7/2011 | Stewart | A01G 27/005 47/65.9 |
| 2013/0067811 | A1 * | 3/2013 | Baker | A01G 9/024 47/81 |
| 2015/0000193 | A1 * | 1/2015 | Cantolino | A01G 27/005 47/79 |
| 2015/0082697 | A1 * | 3/2015 | Cantolino | A01G 9/02 47/79 |
| 2015/0282441 | A1 * | 10/2015 | Marshall | A01G 27/00 47/79 |
| 2015/0282443 | A1 * | 10/2015 | Marshall | A01G 27/00 47/79 |
| 2016/0219806 | A1 * | 8/2016 | Thiessen | G05B 15/02 |
| 2017/0303481 | A1 | 10/2017 | Marshall | |
| 2017/0347538 | A1 * | 12/2017 | Nakajima | A01G 9/247 |
| 2018/0077885 | A1 * | 3/2018 | Jun | A01G 31/06 |
| 2019/0033238 | A1 * | 1/2019 | Al-Harbi | G01N 24/081 |
| 2019/0191643 | A1 * | 6/2019 | Chan | H05B 45/10 |
| 2019/0327921 | A1 * | 10/2019 | Nelson | A01G 9/02 |
| 2020/0196534 | A1 * | 6/2020 | Spiro | A01G 9/023 |
| 2021/0176934 | A1 * | 6/2021 | Su | A01G 27/005 |
| 2021/0298250 | A1 * | 9/2021 | Quiring | A01G 27/005 |

FOREIGN PATENT DOCUMENTS

| | | | | |
|---|---|---|---|---|
| CN | 106069640 | A * | 11/2016 | |
| CN | 106105833 | A | 11/2016 | |
| CN | 106818282 | A * | 6/2017 | A01G 27/00 |
| CN | 108781892 | A * | 11/2018 | |
| CN | 109041890 | A | 12/2018 | |
| CN | 109328735 | A * | 2/2019 | A01B 79/02 |
| CN | 110150110 | A * | 8/2019 | |
| CN | 110235758 | A * | 9/2019 | |
| CN | 110710395 | A * | 1/2020 | |
| CN | 111685027 | A * | 9/2020 | |
| CN | 112889535 | A * | 6/2021 | |
| CN | 113115666 | A * | 7/2021 | |
| CN | 111466231 | B * | 10/2021 | A01G 27/00 |
| CN | 113875565 | A * | 1/2022 | |
| CN | 114600754 | A * | 6/2022 | |
| DE | 19503740 | A1 | 9/1995 | |
| EP | 0394199 | A1 * | 10/1990 | |
| EP | 0462018 | A1 * | 12/1991 | |
| FR | 2572251 | A3 * | 5/1986 | |
| KR | 0125338 | Y1 * | 4/1999 | |
| KR | 101240375 | B1 * | 3/2013 | |
| KR | 20160050407 | A | 5/2016 | |
| KR | 20180056434 | A * | 5/2018 | |
| KR | 102363528 | B1 * | 2/2022 | |
| KR | 20220157104 | A * | 11/2022 | |
| WO | WO-9012495 | A1 * | 11/1990 | |
| WO | WO-2009136148 | A1 * | 11/2009 | A01G 27/001 |
| WO | WO-2013185151 | A1 * | 12/2013 | A01G 27/02 |
| WO | WO-2015108053 | A1 * | 7/2015 | A01G 27/005 |
| WO | WO-2018169254 | A1 * | 9/2018 | A01G 27/003 |
| WO | WO-2020049640 | A1 * | 3/2020 | |
| WO | WO-2022175341 | A1 * | 8/2022 | A01G 25/00 |

OTHER PUBLICATIONS

Merged translation of EP_0394199 (Year: 1990).*
Merged translation of WO_9012495 (Year: 1990).*
Merged translation of EP_0462018 (Year: 1991).*
Merged translation of KR_0125338 (Year: 1999).*
Merged translation of WO_2009136148 (Year: 2009).*
Merged translation of WO_2013185151 (Year: 2013).*
Merged translation of CN_105165567 (Year: 2015).*
Merged translation of WO_2015108053 (Year: 2015).*
Merged translation of KR_101240375 (Year: 2016).*
Merged translation of KR_20180056434 (Year: 2018).*
Merged translation of WO_2018169254 (Year: 2018).*
Merged translation of CN_109328735 (Year: 2019).*
Merged translation of CN_110150110 (Year: 2019).*
Merged translation of CN_110235758 (Year: 2019).*
Merged translation of CN_110710395 (Year: 2020).*
Merged translation of CN_111685027 (Year: 2020).*

(56) References Cited

OTHER PUBLICATIONS

Merged translation of WO_2020049640 (Year: 2020).*
Merged translation of CN_111466231 (Year: 2021).*
Merged translation of CN_112889535 (Year: 2021).*
Merged translation of CN_113115666 (Year: 2021).*
Merged translation of KR_102363528 (Year: 2022).*
Merged translation of KR_20220157104 (Year: 2022).*
Merged translation of WO_2022175341 (Year: 2022).*

* cited by examiner

FIG. 26A
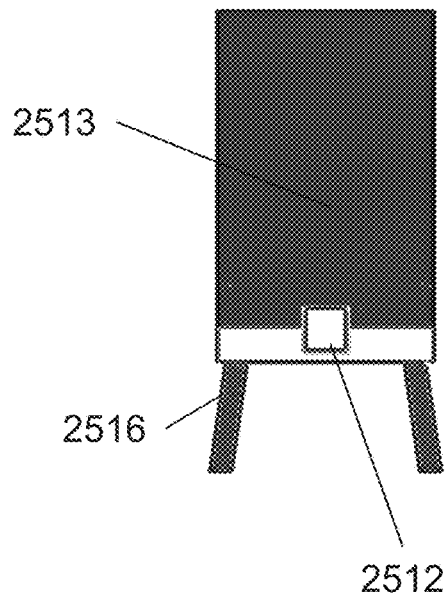
FIG. 26B
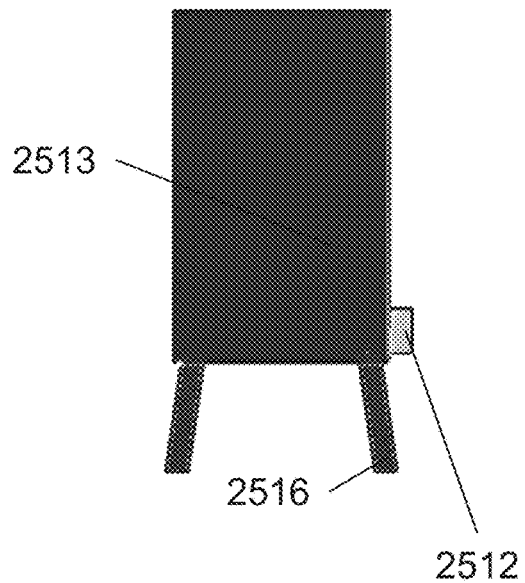
FIG. 26C
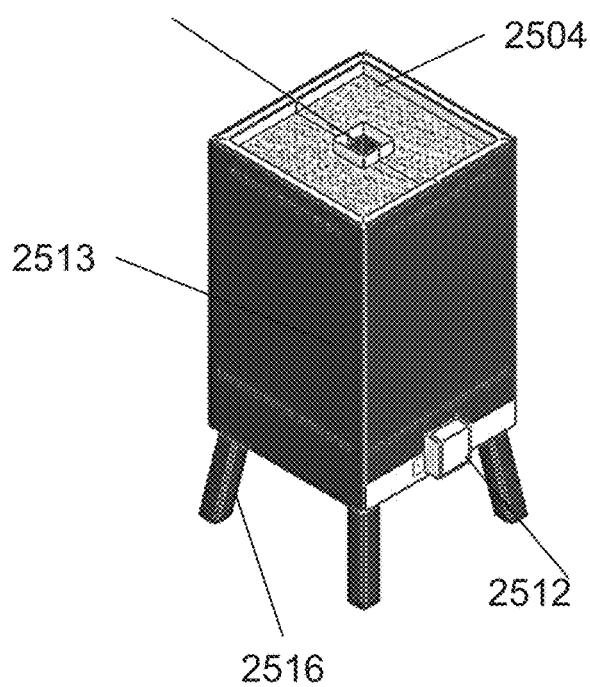
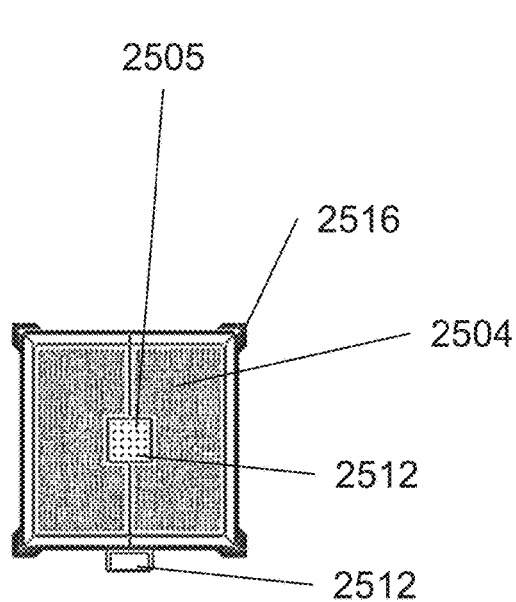
FIG. 26D

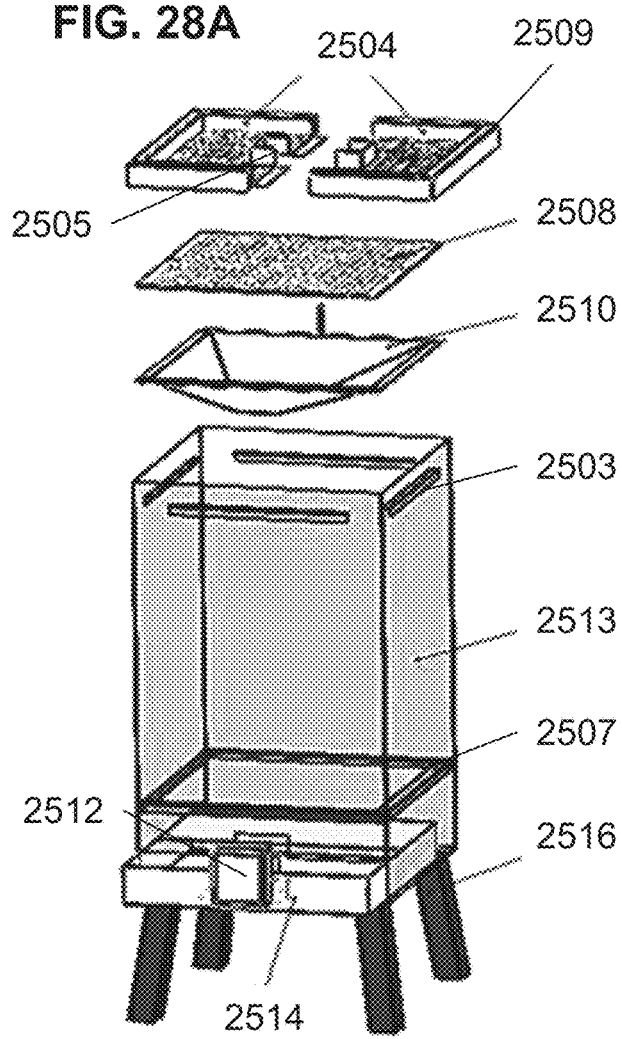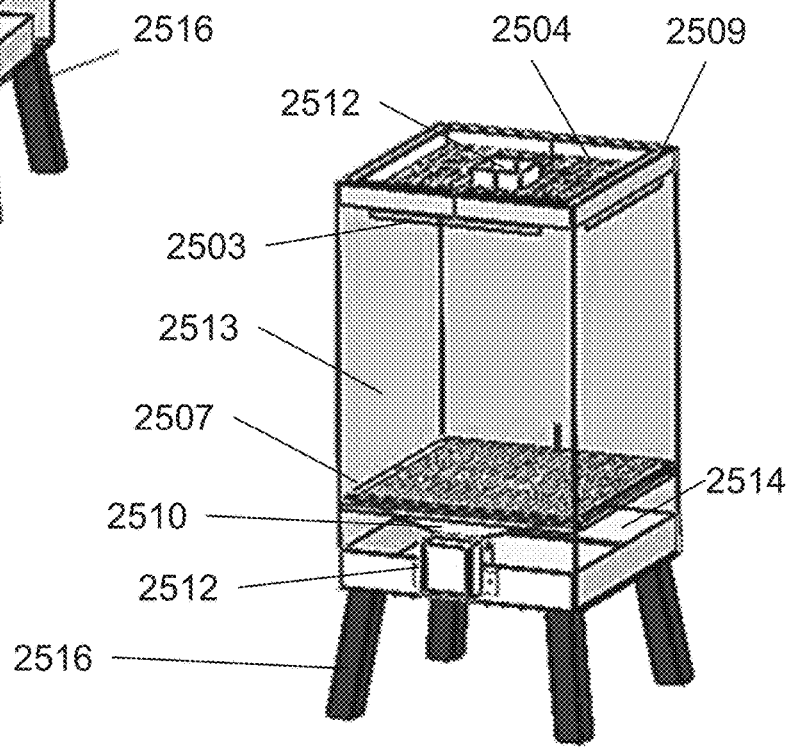

SYSTEM FOR SATURATING A MEDIUM

RELATED APPLICATION/S

This application claims the benefit of priority of Israeli Patent Application No. 282247 filed 11 May 2021 and U.S. Provisional 63/306,118 dated 3 Feb. 2022, the contents of which are incorporated herein by reference in their entirety.

FIELD AND BACKGROUND OF THE INVENTION

The present invention, in some embodiments thereof, relates to a device for distributing a liquid and, more particularly, but not exclusively, to a liquid dispensing device for controlling the distribution of water over an area.

Chinese patent no. CN106105833 appears to disclose "The invention relates to a cultivating device which comprises a substrate, a tray body, a drip irrigation device and a ventilating assembly. The substrate is provided with a bearing face. The bearing face is provided with a containing groove and a plurality of ventilating grooves. The ventilating grooves are communicated with the containing groove. The tray body is arranged in the containing groove. The tray body comprises a planting cover body, a tray bottom and a tray wall. The planting cover body is provided with a plurality of planting holes and a plurality of drip irrigation openings. A leakage hole is formed in the tray bottom. A plurality of ventilating holes are formed in the tray wall and are aligned with the ventilating grooves. The drip irrigation device comprises a dripping device, a dripping pipe and a dripping valve, wherein the dripping device is communicated with the dripping pipe, the dripping valve is connected with the dripping pipe, and the dripping device is movably aligned with the drip irrigation openings. The ventilating assembly is detachably clamped at the end, away from the containing groove, of the ventilating grooves. By placing the tray body on a base, the bottom of the tray body is suspended, and therefore liquid discharged out of the tray body can fall to the bottom of the containing groove and is prevented from blocking the ventilating grooves, ventilating effect is better, air circulating speed is increased, and seedling growth and development are easy."

U.S. Pat. No. 4,760,666 appears to disclose "A watering device for plants comprises a plant container which is balanced on a horizontal pivot rod by an adjusting weight member. A water reservoir tank is operatively associated with the plant container so that as the plant container becomes lighter as to a loss of water. The adjusting weight member disposed at the opposite end of the horizontal pivot rod from the plant container actuates a valve in the water reservoir tank and transfer water from the water reservoir tank to the plant container until a balance is again achieved. When the balance is reached, the valve in the water tank is again closed."

U.S. Pat. No. 5,020,261 appears to disclose "A moisture sensitive self-watering planter utilizes a control valve to effect watering of the soil in a liner of the planter upon automatic detection of a predetermined level of dryness of the soil. The planter uses a weight-based system of detecting the amount of moisture in the soil to control the automatic release of a predetermined amount of water into the soil for rehydration thereof. As the weight of the soil increases with the volume of water, the valve is automatically closed to terminate the irrigation process."

German patent no. DE19503740 1 appears to disclose "The water content indicator comprises a see-saw (3) whose first arm (4) is inserted under an edge (2) of the vessel. The other arm (6) of the see-saw receives a counter-weight (7) which cannot lift up the vessel when it just contains a sufficient amount of water. In one embodiment the arm of the see-saw which admits the counter-weight is continuous with the other arm or may be bentupwards at a bend. The see-saw may have a step-shaped bend at its fulcrum."

US patent no. US2017303481 appears to disclose "An irrigation apparatus and feeding system for dispersing liquid through a plant growing medium are disclosed. The apparatus includes a geometrically shaped container of variable size. Container has an outer wall with an inner surface, an open top, and a base portion configured to cover the plant growing medium. Base portion is configured with a plurality of holes for receiving liquid therethrough. Container is configured with at least one center opening therethrough having an inner wall for receiving a plant. Center opening has at least one longitudinal opening extending therefrom to outer wall to allow placement of container on plant or to allow removal of container from plant. The plurality of holes has at least one dripper for receiving liquid extending therethrough base portion such that the at least one dripper feeds plant growing medium at variable flow rates and intervals and provides stability for apparatus to be secured in plant growing medium."

Korean patent no. KR20160050407 2 appears to disclose "The present invention relates to an apparatus for feeding water to a flowerpot which has control valves to control the amount of water to be drained from a water storage tank and inserted to a valve tank, and discharges the water externally by a buoyancy switch in the valve tank. Thus, the apparatus for feeding water automatically to a flowerpot has relatively less failure rates since complicated machines and electronic devices are not used in the apparatus. The apparatus for feeding water to a flowerpot comprises: the water storage tank in which a large quantity of water is stored and having a plurality of discharge holes formed on a bottom portion thereof; the control valves coupled to drain pipes and controlling the amount of water to be discharged, wherein the drain pipes are connected to the drain holes in the water storage tank; the valve tank to which one end of the drain pipes is connected so water inputted through the same is stored therein, whose opening/closing hole arranged on a bottom portion of the opening/closing body is opened and closed by the ascending buoyant body to which a magnet body on an upper end of the valve tank is to be attached and having the magnet body on the upper end thereof; and the buoyant switch formed on an upper portion of the valve tank, ascended by buoyancy power so the magnet body formed on the upper portion of the valve tank is opened to allow the buoyant body to be ascended by the magnetic power."

SUMMARY OF THE INVENTION

According to an aspect of some embodiments of the invention, there is provided a fluid dispensing device including: a container for a fluid located above an area, the container including a bottom portion with a plurality of apertures for the fluid to flow down to the area, a control mechanism within the container for impeding a flow of the fluid to the plurality of apertures, a supply mechanism to supply fluid to the container, and a blocking mechanism to impede and/or fully block the supply mechanism from supplying the fluid when a threshold quantity of the fluid is detected.

According to some embodiments of the invention, the area comprises a plant growing medium within a vessel, the vessel including a bottom surface with drainage holes, the fluid dispensing device further including a collection tray below the drainage holes for collecting the fluid from the drainage holes.

According to some embodiments of the invention the threshold quantity of fluid is detected in the collection tray.

According to some embodiments of the invention, the device includes a connection from the collection tray to a plug, whereby the collection tray is displaced by fluid collected from the drainage holes, the displacement mechanically detected and the displacement mechanically actuating the plug to block the supply of the fluid.

According to some embodiments of the invention the device includes a lever with a fulcrum between a first arm connected to the collection tray and a second arm connected to the plug, where the first arm is displaced downward by a weight of the collected fluid, thereby raising the second arm and the plug, the raised plug blocking the supply of the fluid.

According to some embodiments of the invention the device includes at least one mechanism chosen from a group including a drip mechanism, a plurality of protrusions, and a size of the apertures.

According to some embodiments of the invention the plurality of protrusions is distributed between the apertures, and extending upwards from the container bottom surface.

According to some embodiments of the invention the sum of volumes of the protrusions including at least 50% of the fluid storing capacity of the container.

According to some embodiments of the invention the protrusions include an upper portion and a lower portion, with a greater surface area at the upper portion and a lower surface area at the lower portion.

According to some embodiments of the invention a distribution of the plurality of apertures comprises equal spacing between the apertures.

According to some embodiments of the invention a distribution of the plurality of apertures corresponds to a shape and size of the area, thereby each equal sized section of the area is under an equal number of apertures.

According to some embodiments of the invention the device includes a vertical opening for a plant to extend through the opening from the area to above the container.

According to some embodiments of the invention the device includes a fluid supply mechanism supplying fluid to the container, the fluid supply mechanism including an enclosed fluid conduit including channels to impede a rate of flow of the fluid.

According to an aspect of some embodiments of the present invention there is provided a gravity powered fluid dispensing device including a container for fluid including a bottom portion with a plurality of apertures, and a fluid flow impeding structure within the container including a plurality of protrusions distributed among the apertures.

According to an aspect of some embodiments of the present invention there is provided the plurality of protrusions extend vertically upwards from the bottom portion;

According to some embodiments of the invention there is provided the plurality of protrusions extending to a height, for example a height of about a maximum level of fluid within the container.

According to some embodiments of the invention there is provided a flow impeding structure whereby the sum of volumes of the plurality of protrusions including at least 50% of the fluid storing capacity of the container.

According to some embodiments of the invention there is provided a flow impeding structure wherein the protrusions including an upper portion and a lower portion, with a greater surface area at the upper portion and a lower surface area at the lower portion.

According to an aspect of some embodiments of the present invention there is provided a method of using a fluid dispensing device including:

Placing plant growing medium in an area below a container including a plurality of apertures, the area drainable into a collection tray, attaching a fluid supply to the container, and voiding the collection tray of fluid.

According to some embodiments of the invention the method includes placing a live plant within the plant growing medium.

According to some embodiments of the invention the method includes measuring the amount of fluid supplied to the area by the fluid supply until a blocking device is actuated to block the supply of fluid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided a method of dispensing fluid including: Supplying fluid from a fluid supply through a conduit to an area containing a plant growing medium; draining excess water from the plant growing medium into a collection tray; and blocking the supplying of fluid when a quantity of fluid in the collection tray is above a threshold value.

According to some embodiments of the invention, the method includes measuring an amount of fluid supplied to the area by supplying until the blocking.

According to some embodiments of the invention, the method further includes: removing the fluid from the collection tray over a period of time; and ceasing the blocking of the fluid supply when a quantity of fluid in the collection tray is reduced to below the threshold value.

According to some embodiments of the invention, the removing is by means of a drainage hole that allows the quantity of fluid to flow through the hole by gravity at a slower rate than the draining.

According to some embodiments of the invention, the removing is by means of a hole that allows the quantity of fluid to flow through the hole by gravity at rate that determines the period of time as the quantity of fluid divided by a rate of flow through the hole.

According to some embodiments of the invention, a length of the period of time is predetermined.

According to some embodiments of the invention, the method further includes ceasing the blocking after a predetermined period of time.

According to an aspect of some embodiments of the invention, there is provided a fluid dispensing device including: an area including a plant growing medium; a fluid source configured supplying a fluid to the area; a bottom surface of the area with drainage holes; a collection tray positioned for collecting the fluid from the drainage holes; a blocking mechanism configured for blocking the supplying the fluid when a quantity of the fluid collected in the collection tray surpasses a threshold.

According to some embodiments of the invention, the fluid dispensing device includes: a releasing mechanism for allowing the supplying to resume after a pre-determined period of time after the blocking.

According to some embodiments of the invention, the releasing mechanism includes a hole for draining water slowly from the collection tray and wherein the releasing mechanism resumes flow after the water in the tray is reduced by the draining to a pre-determined mass.

According to some embodiments of the invention, the fluid dispensing device includes: a connection from the collection tray to a plug, whereby the collection tray is in an initial position when the quantity of the fluid in the collection tray is below the threshold, and the collection tray is in a downward displacement when the quantity of the fluid in the collection tray is above the threshold, the downward displacement mechanically actuates the plug to impede the supplying of the fluid.

According to some embodiments of the invention, the fluid dispensing device includes: a lever with a fulcrum between a first arm connected to the collection tray and a second arm connected to the plug, where the first arm is displaced downward by a weight of the fluid in the collection tray, thereby raising the second arm and the plug, the raising of the plug impeding the supply of the fluid.

According to some embodiments of the invention, the fluid dispensing device includes: an elastic connection between the collection tray and the area, whereby a force of a weight of the fluid in the collection tray causes the elastic connection to extend and the collection tray to be displaced downward.

According to some embodiments of the invention, the fluid dispensing device includes: a latching mechanism and a latch releasing mechanism, the latching mechanism including a latch to prevent the collection tray from rising towards the initial position from the downward displacement when the quantity of the fluid in the collection tray drops below the threshold, and the latch releasing mechanism including a mechanism to release the latch after a period of time measured from a most recent rising of the collection tray.

According to some embodiments of the invention, the fluid dispensing device includes: a transforming mechanism that transforms a downward displacement of the collection tray to rotational motion of a latch, the latch rotating to a position extending above the collection tray thereby, latching and preventing the collection tray from rising.

According to some embodiments of the invention, the fluid dispensing device includes a vertical opening for a plant to extend through the opening from the area to above the area.

According to some embodiments of the invention, the fluid source includes a container of fluid.

According to some embodiments of the invention, the fluid source includes a valve connected to a water supply pipe.

According to some embodiments of the invention, the fluid dispensing device includes a fluid supply mechanism channel with a maze to control a rate of the supplying of the fluid.

According to an aspect of some embodiments of the invention, there is provided a method of watering a plant including: supplying a planter having a water distributor, a growth medium and a drainage indicator; applying water to the water distributor; distributing, by the distributor, of the water evenly over an upper surface of the growth medium over a period of time; collecting water draining through the growth medium in the indicator; monitoring when the indicator indicates a rate of the draining has reached a desired rate; stopping the watering when the indicator indicates the rate of the draining has reached the desired rate; waiting; and reapplying water to the water distributer after the waiting.

According to some embodiments of the invention, the distributing is by means of a plurality of apertures and regulators for applying water evenly over a surface of the growth medium.

According to some embodiments of the invention, the method where each regulator includes at least one of a torturous path, a maze, protrusions, and a membrane.

According to some embodiments of the invention, the applying includes pooling water on top of the distributor.

According to some embodiments of the invention, the waiting is until the growth medium dries.

According to some embodiments of the invention, the waiting is for a predetermined time period.

According to some embodiments of the invention, the predetermined time period is dependent on a time of plant growing in the planter.

According to some embodiments of the invention, the indicator includes a water storage and a drain hole and wherein the monitoring includes monitoring a water level in the water storage.

According to some embodiments of the invention, the distributor distributes the water onto the surface in a time period of between 1 to 10 minutes.

According to an aspect of some embodiments of the invention, there is provided a planter configured to encourage proper watering of a plant: an enclosure enclosing a growth medium; a water distributor configured for distributing of water applied thereto evenly over an upper surface of the growth medium over a period of time; a floor configured to support the growth medium and to allow water to drain from the growth medium; and an indicator configured to collect the water draining through the growth medium and indicate when the rate of the draining is more than a threshold rate.

According to some embodiments of the invention, the water distributor includes a screen.

According to some embodiments of the invention, the water distributor includes an opening for a plant to pass therethrough.

According to some embodiments of the invention, the includes an enclosed space to hold water.

According to some embodiments of the invention, the planter further includes a wall al.

According to some embodiments of the invention, the distributor is made in multiple pieces to allow removal without breaking the plant.

According to some embodiments of the invention, the indicator includes a cup with a slow water drain.

According to some embodiments of the invention, the distributor includes a plurality of apertures and regulators for applying water evenly over a surface of the growth medium.

According to some embodiments of the invention, the planter where each regulator includes at least one of a torturous path, a maze, protrusions, and a membrane.

According to some embodiments of the invention, the distributor includes a retainer configured for containing water pooled on top of the distributor.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and/or images. With specific reference now to the drawings and/or images in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings and/or images:

FIG. 26A is a side view of a plant watering system in accordance with an embodiment of the current invention.

FIG. 26B is a side view of a plant watering system in accordance with an embodiment of the current invention.

FIG. 26C is a top view of a plant watering system machine in accordance with an embodiment of the current invention.

FIG. 26D is a perspective view of a plant watering system in accordance with an embodiment of the current invention.

FIG. 28A is an exploded view of a plant watering system with a water drainage reservoir in an open position in accordance with an embodiment of the current invention.

FIG. 28B is a perspective view of a plant watering system in accordance with an embodiment of the current invention.

FIG. 31 is a flow diagram a plant watering system in accordance with an embodiment of the current invention.

DESCRIPTION OF SPECIFIC EMBODIMENTS OF THE INVENTION

Figure 1:
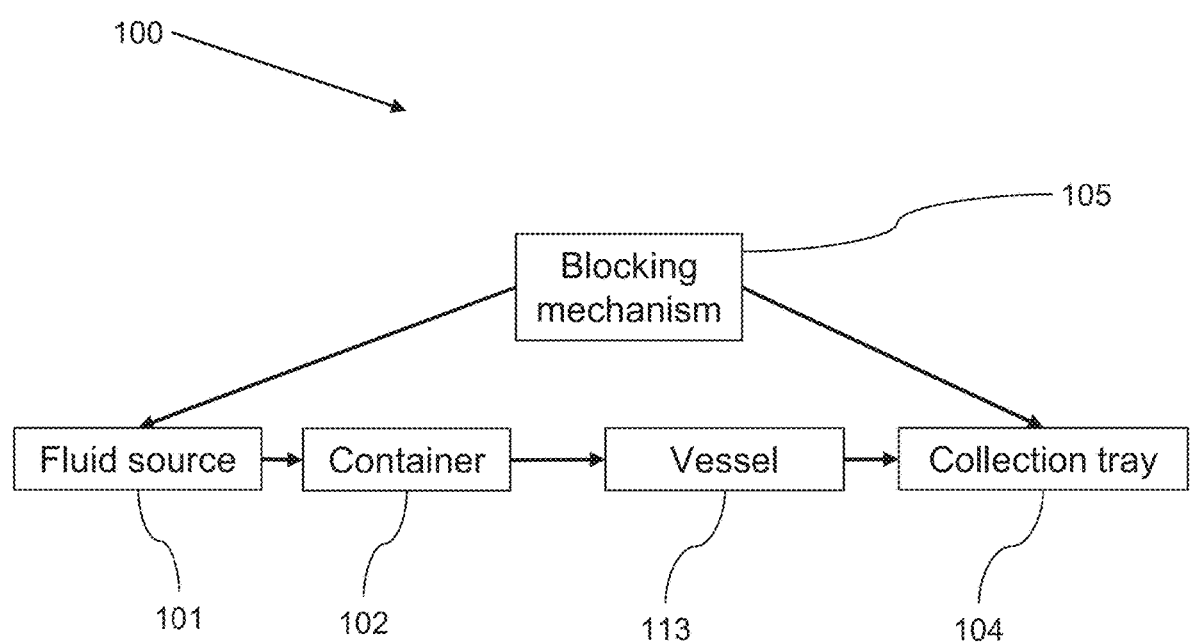
FIG. 1 is a block diagram of a fluid dispenser, in accordance with an embodiment of the current invention.

The present invention, in some embodiments thereof, relates to a device for distributing a fluid and, more particularly, but not exclusively, to a fluid dispensing device for controlling the distribution of water over an area.

Many plants are killed by inconsistent watering. The plants may be, for example, edible and/or decorative. Therefore, there is a need for a system which provides consistent soil moisture for plant growth.

The present invention, referred to herein as a fluid dispenser, in some embodiments may comprise a device for dispensing a fluid, for example water, so as to achieve saturation of a plant growing medium, for example soil.

In some embodiments, the fluid dispenser may be employed to detect a saturation point of a plant growing medium in a vessel.

In some embodiments, the fluid dispenser may be employed to measure the capacity of medium to retain a fluid. For example, the fluid dispenser may be employed to measure the field capacity of a plant growing medium. Alternatively or additionally, the system may be used to measure the fluid capacity of other materials.

In some embodiments, the fluid dispenser may be employed to ensure a plant growing medium with a plant has an ideal amount of retained fluid. For example, the fluid dispenser may provide an amount of fluid to saturate a plant growing medium, independent of the climate and/or age or size of plant growing in the plant growing medium. For example, the saturation point may depend on the absorbency of the plant growing medium.

In some embodiments the fluid dispenser may comprise a control mechanism for controlling the flow of fluid to a plant growing medium. For example, the fluid dispenser may comprise a fluid holding container with apertures on a bottom portion to allow fluid to flow down to a vessel. The rate of flow of fluid through the apertures may be controlled by a plurality of apertures extending upwards from the bottom portion, such that the physical property of adhesion of water may impede the flow of the fluid to the apertures.

In some embodiments, the fluid dispenser may provide substantially equal dispersion of fluid to an area. For example, the distribution of apertures in a container may comprise substantially equal spacing between apertures, to allow substantially even dispersion of fluid flowing through the apertures to an area under the container.

In some embodiments the geometry of the distribution of apertures may correspond to the 2-dimensional shape of an area for receiving the fluid from the apertures, thereby enabling substantially equal dispersion of fluid from a container to an area.

In some embodiments, the fluid dispenser may comprise a mechanism for equalizing the rate flow of fluid from the container apertures when the level of fluid in the container may vary. For example, due to the force of gravity, the rate of flow through the container apertures will be greater when the level of fluid in the container is higher, and the rate of flow may be lower when the level of fluid in the container is lower. The force of adhesion of the fluid to the apertures may partially and/or fully compensate for the force of gravity, since the force of adhesion may be proportional to the height level of fluid, since a higher level of fluid would be in contact with a greater surface area of the apertures than a lower level. At a higher level of fluid, the increased force of gravity may be partially and/or fully counteracted by the force of adhesion, thereby allowing the flow of the fluid through the apertures to approach a steady rate regardless of the height of fluid in the container.

In some embodiments the flow of fluid may be stopped by a weight activated mechanism. For example, when a threshold quantity of fluid is collected, for example in a collection tray, the weight of the fluid may actuate a blocking mechanism to cause the flow of fluid to slow and/or cease.

In some embodiments, the fluid may be wholly or substantially water, for example water mixed with fertilizer, pesticide, herbicide, and/or any other substance.

An aspect of some embodiments of the current invention relates to a plant watering system, and, more particularly, to provide consistent soil moisture is disclosed and described. Optionally, the plant watering system may comprise an enclosure with a first screen, a floor with drainage holes, a funnel, a water monitor (e.g., cup and/or funnel) and/or the drainage reservoir. The water monitor is optional. The water monitor may serve to check the level of saturation of the soil and/or to check the level of water in a drainage reservoir. For example, the user may directly check the water level in the drainage reservoir. Optionally, the plant watering system may be mounted on a stand. Optionally, the drainage reservoir may comprise a window and/or a cup. Optionally, the drainage reservoir may be reversibly removable. Optionally, the enclosure may be opened. Optionally, the plant watering system may comprise a heating and/or cooling system. Optionally, the plant watering system may comprise a lighting system. Optionally, the plant watering system may comprise a waste management system. Optionally, one or more screens may allow water to slowly drip through them. Optionally, the water may drip through a first screen evenly over the soil and/or the plants in the enclosure. Optionally, the soil may be saturated by the water. Optionally, a user may monitor the soil moisture level. Optionally, water may drip through a floor with drainage holes through a funnel into a water monitor (e.g., cup and/or funnel) and/or drainage reservoir. For example, the water may pass through water monitor to the drainage reservoir. Optionally the water monitor may serve as a water level indicator for the drainage reservoir. Optionally, a user may monitor the amount of water in the drainage reservoir. Optionally, the window and/or cup may allow the user to observe the amount of water in the drainage reservoir. Optionally, the type of plant and/or amount of water in the drainage reservoir may determine when next the user should water the plants. Optionally, the drainage reservoir may be removed and/or emptied. Optionally, the plant watering system may be portable.

For example, the plant watering system may be used as green house for growing plants include for example, edible and/or decorative plants.

An embodiment of the invention relates to a plant watering system which may provide consistent soil moisture.

In an embodiment, the plant watering system may comprise at least an enclosure with a first screen, a floor with drainage holes, a funnel, a drainage reservoir and/or a water monitor. Optionally, the plant watering system may be mounted on a stand. Optionally, all of the components of the plant watering system may be easily and conveniently inserted and replaced.

In an embodiment, the plant watering system may comprise an enclosure. Optionally, the enclosure may comprise a frame. Optionally, the frame may be made from stainless steel, bronze, aluminum, plastic, etc. Optionally, the enclosure may be opened, e.g., by removing a cover or screen. Optionally, the enclosure may comprise of one or more panels. Optionally, one or more panels may have a handle. Optionally, one or more panels may be opened and closed, e.g., by sliding, rotation about a pivot, hinge, etc. Optionally, one or more panels may be fixed and/or locked in place. Optionally, the enclosure may comprise one or more supports. Optionally, one or more supports may be located on the inner surfaces of one or more panels.

In an embodiment, the enclosure or parts thereof may be made from high quality transparent, partially transparent, translucent and/or opaque material, e.g., wood, glass or plastic. Preferably, the enclosure material may be non-toxic and shatter resistant. For example, the enclosure may be made from acrylic (polymethlamethacrylate), butyrate (cellulose acetate butyrate), polyvinyl chloride, polycarbonate, polyethylene terephthalate, glycol modified polyethylene terphthalate, polytetrafluoroethylene, polystyrene, polypropylene, polyamide, polyethylene, thermoplastic, polyurethane, elasticized plastics, etc. and/or combinations thereof. Optionally, all or part of the enclosure container may be transparent and/or translucent to certain wavelengths of light. Optionally, all or part of one or more surfaces of the enclosure may be coated to allow certain wavelengths of light to enter the enclosure.

In an embodiment, one or more screens may comprise of a mesh. Optionally, one or more screens may be made from stainless steel, bronze, aluminum, fiber glass, polyester, vinyl-coated polyester, cotton, bamboo, etc. Optionally, the screen may have a mesh size of about 5-500 Mesh, about 20-400 Mesh, 30-300 Mesh, 40-200 Mesh, or 50-100 Mesh. Optionally, the wire diameter of the screen may be 0.001-1.0 mm, 0.05-0.5 mm, 0.075-0.25 mm, or 0.08-0.1 mm. Optionally, the screen may have a frame. Optionally, the frame may be made from stainless steel, bronze, aluminum, plastic, etc. Optionally, the screen may comprise an opening. Optionally, the screen may fit over or into the enclosure.

In an embodiment, a first screen may be located at the upper portion of the enclosure. Optionally, the screen may fit over or into the enclosure. Optionally, the screen may rest on one or more supports on one or more panels of the enclosure. Optionally, the screen may comprise two or more pieces e.g., which may interlock. Optionally, the screen may comprise an opening. For example, water may be poured over a first screen, and slowly, and evenly drip through the screen onto the soil and/or plants within the enclosure.

In an embodiment, the plant watering system may comprise a floor upon which the soil and plants rest. Optionally, the floor may be porous and/or perforated. Optionally, the floor may comprise a porous material. Optionally, the floor may comprise a material with a number of small openings and/or holes in it. Optionally, the floor may comprise an array of small openings and/or holes. Optionally, the floor may comprise a frame. Optionally, the floor may be supported by one or more supports. Optionally, the height of the floor may be adjusted. Optionally, the height of the floor relative to a first screen and/or a floor with drainage holes may be adjusted by placing it on a higher or lower support on one or more panels of the enclosure. Optionally, a user may monitor the soil pH. Optionally, a user may monitor the soil moisture level. For example, once the soil is saturated with moisture, excess water may drain through the floor.

In an embodiment, a floor with drainage holes and/or a screen may be located within the enclosure. Optionally, the floor with drainage holes may comprise a different material, a different mesh size and/or a different wire diameter to the first screen. Optionally, the floor with drainage holes may have a frame. Optionally, the frame may be made from stainless steel, bronze, aluminum, plastic, etc. Optionally, the floor with drainage holes may be flat, concave, pyramidal, etc. in shape. Optionally, the floor with drainage holes may rest on one or more supports on one or more panels of the enclosure. Optionally, the floor with drainage holes may rest on one or more of the same supports as the floor on one or more panels of the enclosure. Optionally, excess water may be filtered through the floor with drainage holes and/or the screen into a water monitor and/or a drip tray or drainage reservoir. Optionally, the screen may trap soil particles and/or organic matter, e.g., leaves. For example, excess water may drain through the soil and may carry soil particles and/or organic matter with it. The floor with drainage holes may trap the soil particles and/or organic matter which may be returned to the enclosure, composted, or discarded.

In an embodiment, the plant watering system may comprise a drip tray or drainage reservoir. Optionally, the drip tray or drainage reservoir may be reversibly removed from the plant watering system, e.g., in order to empty it. Optionally, the drainage reservoir may slide out of the enclosure. Optionally, the water collected in the drainage reservoir may be reused to water the plants in the enclosure. Optionally, a user may monitor the amount of water in the drainage reservoir. Optionally, the drainage reservoir may comprise one or more graduations to determine the water level. Optionally, the drainage reservoir may comprise a window. Optionally, the window may be graduated. For example, by subtracting the amount of water the amounted of water applied and the amount collected from drainage reservoir to understand how much water remained in the soil and/or how much water has been taken up by evapotranspiration. Optionally, the window may have a cover. For example, the window may be used to see the level of water in the reservoir. Optionally, the drainage reservoir may comprise a cup. For example, water may drain from the soil into a funnel which may direct the draining water into the cup. Optionally the cup may include a small hole in the bottom that allows water to drain out slowly. For example, the cup may server as a soil saturation monitor. For example, when the soil is not saturated, any water draining out of the soil into the cup will drain through the small hole in the bottom of the cup and the cup will stay substantially empty. Optionally when the soil is saturated, water will drain more quickly from the soil and the cup will accumulate water. The cup is optionally smaller than the drainage reservoir and/or will fill quickly and/or the water level in the cup will be more sensitive and/or react more quickly to changes in saturation than the larger drainage reservoir. In some embodiments, the cup may be sunk into the drainage reservoir. Thus, it may serve as a soil saturation indicator and/or as a level indicator for the drainage reservoir. Optionally, the cup may be graduated. Optionally, the graduations on the drainage reservoir, window and/or cup may allow the user to monitor the amount of water in the drainage reservoir. Optionally, the drainage reservoir may have a controllable opening e.g., a tap to empty the drainage reservoir. For example, when a user sees that the soil is saturated, he may stop watering. For example, when a user sees that the drainage reservoir is getting full, he may empty it. Optionally there is a way to empty the drainage reservoir without moving the plant. For example, the reservoir may be removable (for example it may come out like a drawer) for emptying and replacing. For example, the reservoir may include a drain hole with a plug and/or valve. In the following a water level indicator may include an indicator of the level of the reservoir and/or a saturation indicator and/or both.

In an embodiment, a user may determine when next to water the plant or plants in the enclosure based on how much water is present in the drainage reservoir after watering, e.g., based on the water level as measured according to the graduations on the drainage reservoir, window, or cup.

In an embodiment, the enclosure may rest on a stand. Optionally, the stand may raise the plant watering system to a convenient height for a user. Optionally, the height of the stand may be adjustable. Optionally, the stand may comprise one or more wheels. Optionally, the plant watering system may be portable.

In an embodiment, various sizes of the plant watering system may be produced, e.g., suitable for use in small areas such as balconies, larger areas such as gardens, or for commercial plant cultivation. Optionally, the plant watering system may be used in a private residence, e.g., a house, apartment, rooftop, balcony, garden and/or commercially.

In an embodiment, the plant watering system may comprise a heating and/or cooling system, e.g., a fan and/or a heater. Optionally a heating and/or cooling system may be used to maintain the conditions within the enclosure at an optimum for plant growth, e.g., heating the enclosure in winter or in cold climates, and/or cooling the enclosure in summer or in hot climates. Optionally, the temperature and/or humidity in the enclosure may be monitored and/or optimized by the user.

In an embodiment, the plant watering system may comprise a lighting system. Optionally, the enclosure may comprise one or more lights to encourage plant growth, e.g., certain wavelengths of light (e.g., UV, IR, etc.).

In an embodiment, the plant watering system may comprise a waste management system, e.g., for disposal of wastewater.

In an embodiment, the plant watering system may be used as green house for growing edible, medicinal, and/or decorative plants.

In an embodiment, all or part of the plant watering system may be made from recycled and/or recyclable materials.

In an embodiment, all or part of the plant watering system may be recyclable and/or reusable.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Fluid Dispenser

Now referring to the drawings, FIG. 1 is a block diagram of a fluid dispenser, in accordance with an embodiment of the current invention.

In some embodiments, fluid dispenser 100 may comprise fluid supply 101, container 102, vessel 113, collection tray 104, and blocking mechanism 105.

In some embodiments fluid supply 101 may be a source of running water, for example a tap and/or faucet, a conduit connected to a tap and/or faucet, and/or any other source of fluid.

In some embodiments fluid supply 101 may be one or more refillable sources of water, for example canisters, bottles, buckets, and/or any other refillable water source.

Figure 2:
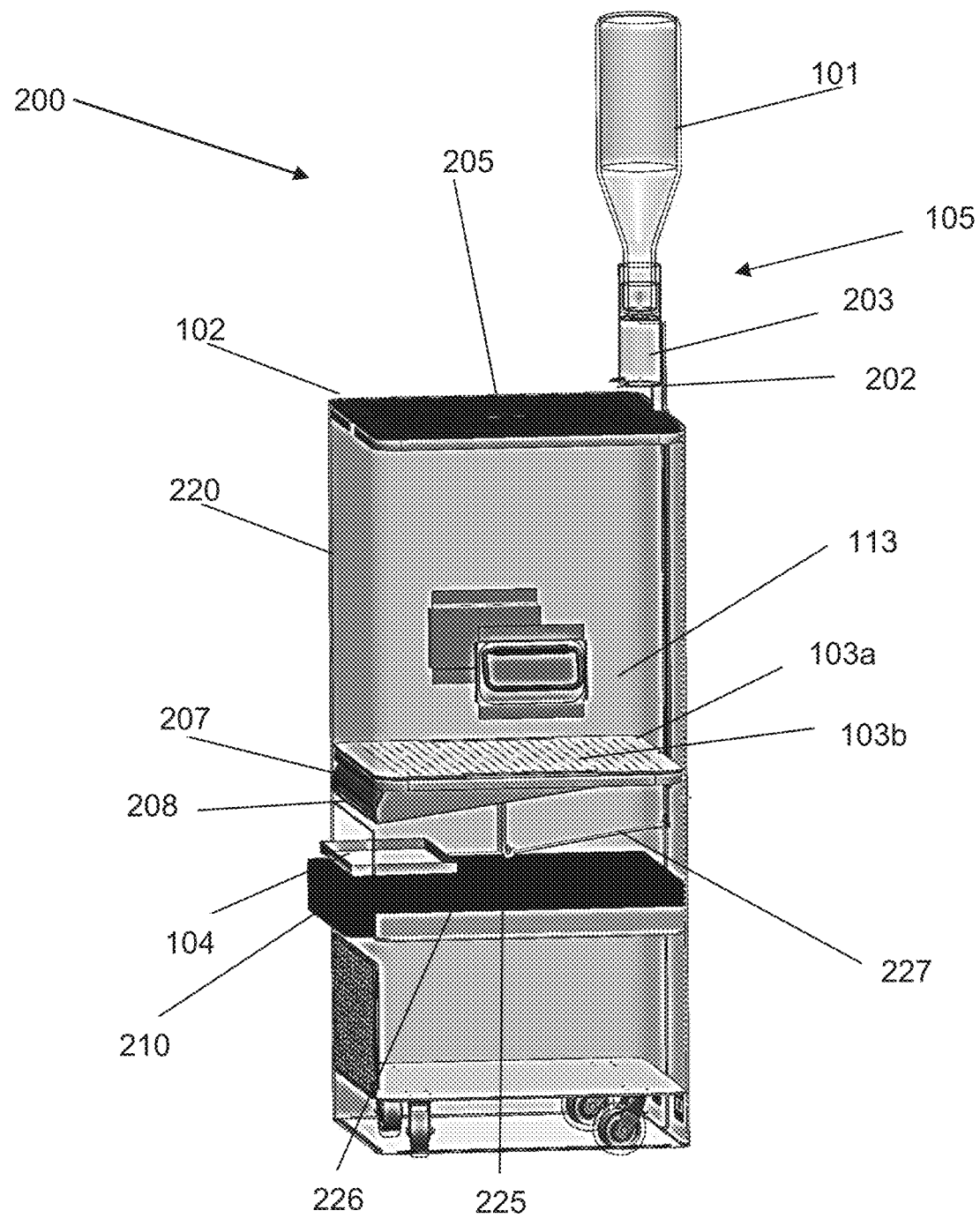
FIG. 2 is a schematic illustration of a fluid dispenser, in accordance with an embodiment of the current invention.
Figure 3:
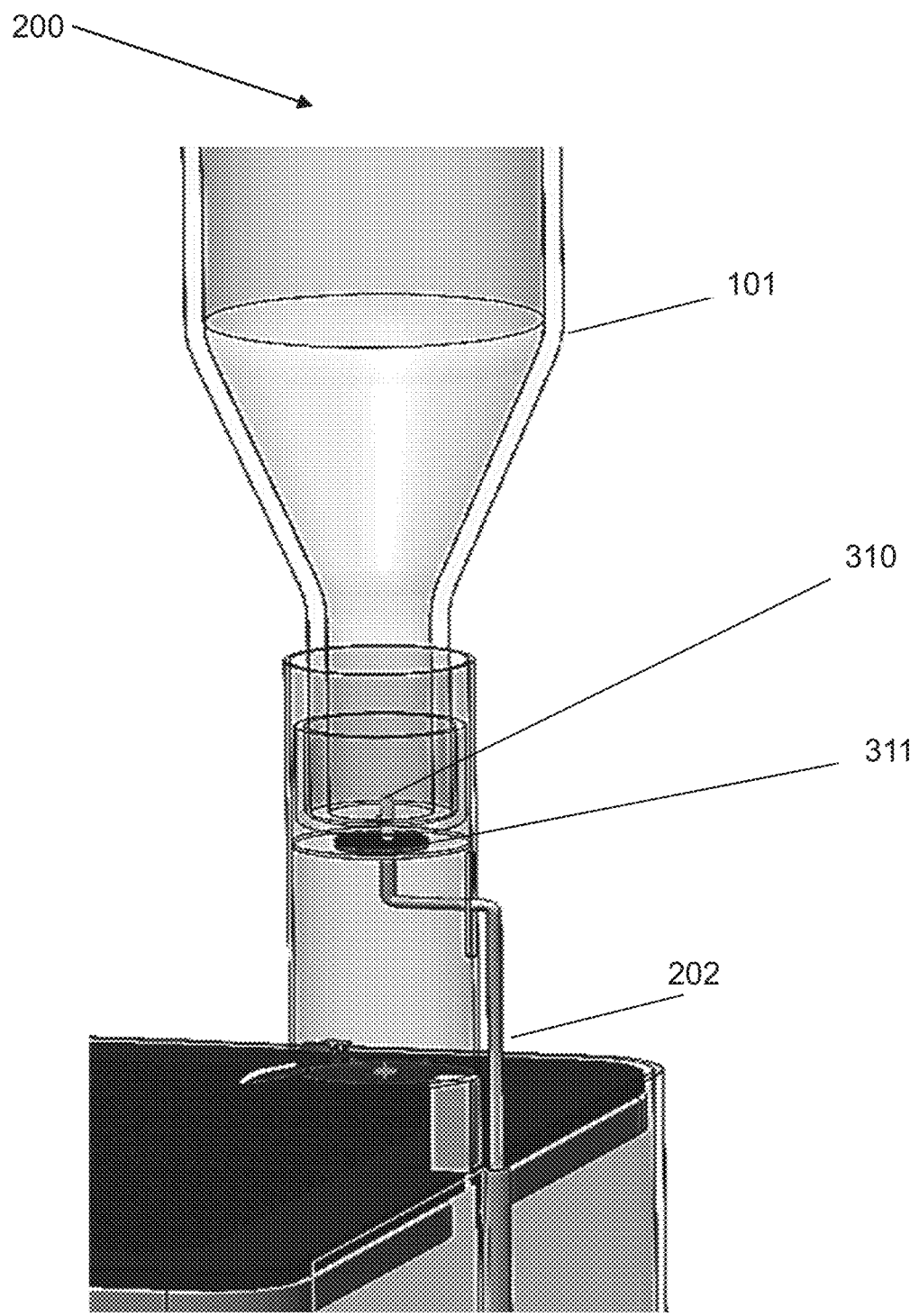
FIG. 3 is a schematic illustration of a portion of a blocking mechanism, in accordance with an embodiment of the current invention.

FIG. 2 is a schematic illustration of a fluid dispenser, in accordance with an embodiment of the current invention, and FIG. 3 is a schematic illustration of a portion of a blocking mechanism, in accordance with an embodiment of the current invention.

In some embodiments the fluid dispenser 200 may comprise a standing unit with side walls 220 enclosing some of fluid dispenser 200 components. For example, vessel 113, collection tray 104 and/or other components may be enclosed by side walls 220. In some embodiments container 102 may be reversibly fitted to rest on an upper opening of fluid dispenser 200, fluid supply 101 may be attached to an upper portion of fluid dispenser 200, and components of blocking mechanism 105 may be connected to fluid supply 101.

In some embodiments, fluid dispenser 200 may comprise drawer 210, located below collection tray 104. In some embodiments drawer 210 when open provides access to collection tray 104, for example to drain collected fluid. In some embodiments, drawer 210 may comprise a storage area for fluid drained from collection tray 104.

In some embodiments, container 102 comprises vertical opening 205, which may be located at a central area of container 102. In some embodiments a plant growing in a plant growing medium in vessel 113 may grow through vertical opening 205 and above container 102.

In some embodiments fluid dispenser 200 may comprise a portable unit, for example with wheels and/or handles for transporting.

Channels to Impede Rate of Flow

In some embodiments, fluid supply 101 may supply fluid to channels 203 thereby impeding the rate of flow of the fluid. For example, channels 203 may comprise a fluid conduit, wherein the fluid is routed through maze, a series of channels, a series of conduits, an adjustable tap and/or valve, and/or any other mechanism to control and/or impede a rate of flow of the fluid. Alternatively or additionally, in some embodiments fluid supply 101 may comprise a mechanism for impeding a rate of flow of fluid, for example a tap, faucet, and/or valve. In some embodiments fluid supply 101 may provide fluid directly to container 102. In some embodiments, fluid supply 101 may comprise channels 203 and/or a similar mechanism for impeding rate of flow.

In some embodiments fluid supply 101 may comprise a means and/or mechanism to measure a volume of fluid supplied to container 102, for example a water meter attached to a source of flowing fluid and/or a marking on a bottle and/or flask supplying fluid. In some embodiments, the measurement may be used to calculate a point of saturation and/or field capacity of a plant growing medium, for example by measuring a volume of fluid supplied by fluid supply 101 until blocking mechanism 105 is actuated to impede and/or cease supply of fluid.

In some embodiments, fluid dispenser 100 may comprise one or more scales or other weight measuring means to weigh container 102 and/or collection tray 104. For example, a comparison of a weight prior to supplying fluid and a weight at the point that the blocking mechanism is actuated may be used to calculate the point of saturation and/or field capacity of the plant growing medium.

Figure 4:
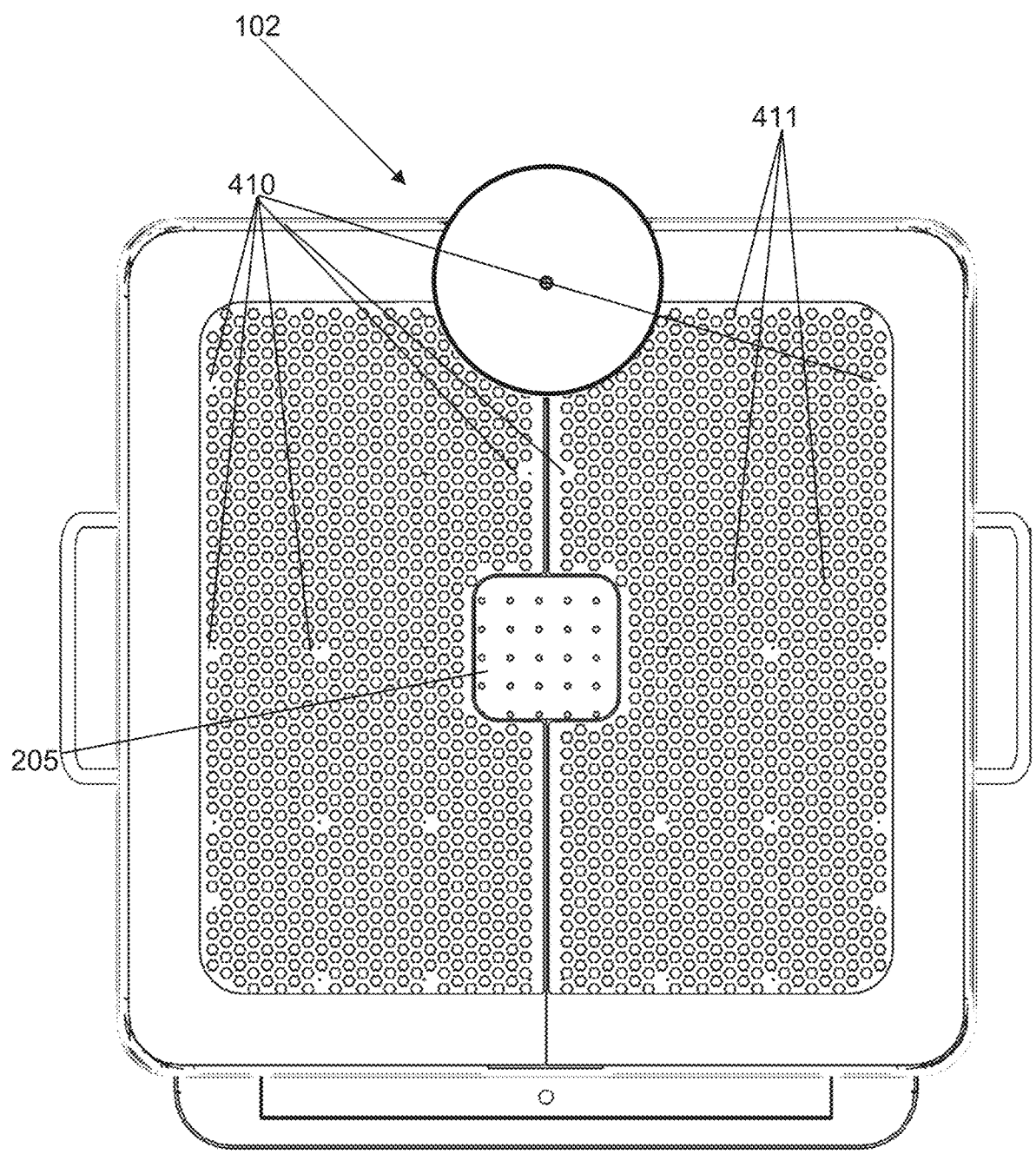
FIG. 4 is a schematic illustration of a top view of a fluid dispenser, in accordance with an embodiment of the current invention.

In some embodiments container 102 may comprise side walls and a plurality of apertures 410 (e.g., as shown in FIG. 4) on a bottom portion, for example apertures 410 e.g., as shown in FIG. 4. In some embodiments Container 102 may comprise a mechanism for storing and controlling a rate of flow of fluid through apertures 410.

Vessel Side Walls

In some embodiments, vessel 113 may comprise side walls, and bottom surface 103a. Bottom surface 103a may comprise drainage holes 103b to allow excess fluid to drain downward. In some embodiments, the side walls 220 of vessel 113 may comprise the side walls of vessel 113. For example, vessel 113 bottom surface 103a may be enclosed by side walls 220, such that side walls 220 comprise the side walls of vessel 113. In some embodiments vessel 113 may comprise a pot, vessel, and/or container of any kind, with side walls independent of side walls 220. In some embodiments vessel 113 and may be partially or completely filled with a plant growing medium, and placed within fluid dispenser 100.

Flow of Fluid Through Fluid Dispenser

In some embodiments, the fluid may flow down through the fluid dispenser 200 may be as follows: the fluid flows from fluid supply 101 to container 102, where the fluid flows through apertures 410 down to vessel 113. The fluid entering vessel 113 may be absorbed by the plant growing medium, for example soil until the plant growing medium reaches a point of saturation. Drainage fluid not absorbed by the plant growing medium may flow through drainage holes 103b in bottom surface 103a into collection tray 104. In some embodiments funnel 207 and funnel spout 208 may direct the fluid exiting drainage holes 103b into collection tray 104. In some embodiments, the fluid may be removed from collection tray 104 by any means, for example removing and emptying collection tray 104 into a drain, a faucet and/or valve may be openable to allow the fluid to exit, and/or any other method of emptying fluid from a tray.

Blocking Mechanism

In some embodiments, fluid dispenser 200 may comprise blocking mechanism 105, comprising fulcrum 225, first arm 226, second arm 227, connector 202, plug 310, and gasket 311.

In some embodiments blocking mechanism 105 may comprise a detector for detecting a threshold quantity of fluid and or a level of fluid, for example within collection tray 104 and/or container 102. For example, the detector may be one or more of any device and/or devices that detects a quantity and/or level of fluid in collection tray 104, for example a float that is lifted by the fluid, a weight sensitive device that is depressed by the weight of the fluid, an expanding device that expands from contact with the fluid, a glass level gauge, a hydrostatic device, a displacer, a bubbler, a differential pressure transmitter, a load cell, a strain gauge, a magnetic level gauge, a pressure sensitive membrane, a level sensor, a pneumatic level sensor, and/or any other mechanical sensor.

In some embodiments, the detector may be an electrical and/or electronic sensor.

In some embodiments the detector may be connected to a plug, for example plug 310, In some embodiments plug 310 may be tapered, for example conical in shape such that a narrower portion may enter a conduit of fluid supply 101, and when further inserted, a less narrow portion may form a blocking seal preventing supply of fluid.

In some embodiments gasket 311 may be attached to and/or actuated by plug 310, such that gasket 311 may enhance the water tight blocking of plug 310.

In some embodiments, the detector may be displaced by the level and/or volume of fluid, thereby actuating a mechanism to partially or completely block fluid supply 101 from supplying fluid to container 102. For example, a float detector may be connected to plug 310, and a level of fluid may raise the float thereby raising plug 310. Optionally plug 310 when raised may block fluid supply 101. In a similar manner, any other type of level or weight detector may actuate blocking mechanism 105.

In some embodiments blocking mechanism 105 may comprise a lever with a fulcrum 225 between a first arm 226 connected to collection tray 104 and a second arm 227 connected to plug 310 by connector 202. Collection tray 104 may be supported by first arm 226. Optionally a weight of fluid collected in collection tray 104 may cause a downward displacement of collection tray 104 from an initial position, and thereby downwardly displacing first arm 226. The downward displacement of first arm 226 may cause an upward displacement of second arm 227 via fulcrum 225, thereby raising plug 310, whereby plug 310 may partially or fully block fluid supply 101 from supplying fluid to container 102.

Figure 11:
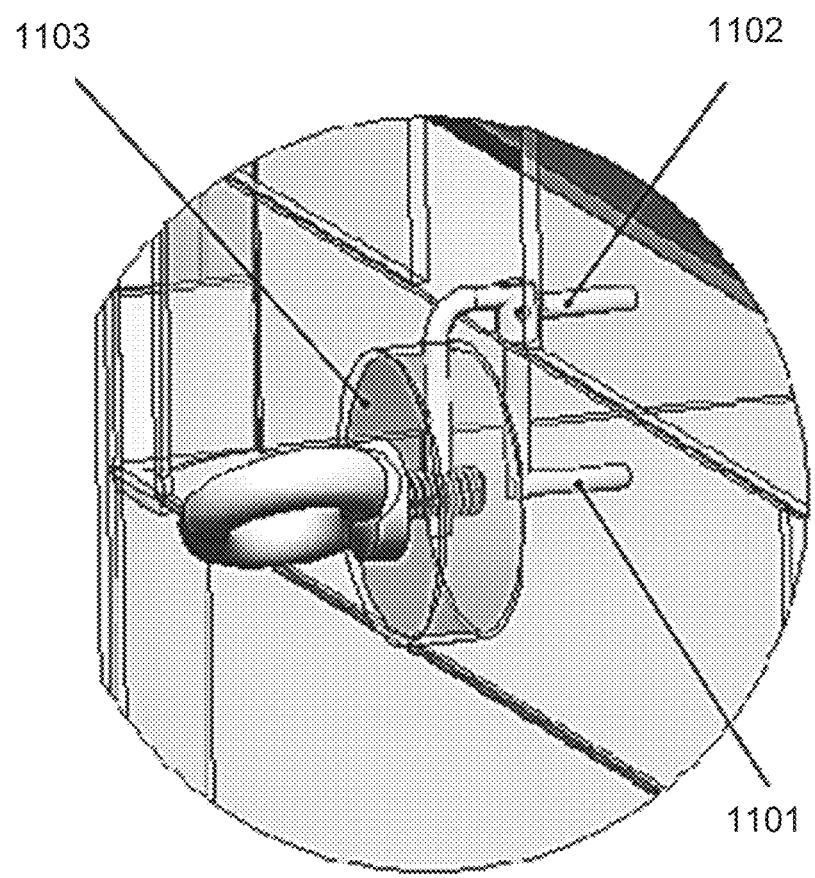
FIG. 11 is a schematic illustration of a latching mechanisms, in accordance with an embodiment of the current invention.

See FIG. 11 for an alternative embodiment of the blocking mechanism comprising a transforming mechanism.

Latching and Releasing Mechanism

In some embodiments, the blocking mechanism may comprise a latching mechanism to latch collection tray 104 at a position of downward displacement, for example when displaced by the weight of fluid. When the fluid in collection tray 104 is evacuated, for example by a drain hole, the latch may prevent collection tray 104 from raising back to an initial upward position. The latch may be any type of latch for example mechanical, electro-magnetic, magnetic, and/or electro-mechanical.

In some embodiments, the latching mechanism may comprise a releasing mechanism to automatically release the latch at a pre-determined time or in response to an event. The releasing mechanism may allow collection tray 104 to rise to a previous position after collected fluid has been evacuated, thereby lowering plug 310 and disabling blocking mechanism 105. For example, in a preferred embodiment the releasing mechanism may be configured to release the latch about 24 hours after the previous time the release mechanism was actuated. For example, the releasing mechanism may comprise a Geneva drive, an internal Geneva drive, a spherical Geneva drive, a Maltese cross, a linkage dwell mechanism, a cam driven dwell mechanism, an intermittent mechanism, a Reuleaux triangle intermittent mechanism, and/or any other type of mechanical, electrical, electronic and/or combination thereof of mechanisms for a actuating latch releasing mechanism at a pre-determined time interval after a previous time that the release mechanism was actuated.

In some embodiments, collection tray 104 may rise to an initial position when fluid is partially or fully removed from collection tray 104, thereby lowering plug 310 and partially and/or fully enabling fluid supply 101 to supply fluid. For example, collection tray 104 may comprise a drainage hole that may allow fluid to exit at a slower rate than the drainage fluid enters from container 102. The drainage hole may allow collection tray 104 to collect fluid and be displaced downwardly by the weight of the collected fluid, and allow a downwardly displaced and latched collection tray to evacuate the fluid over a period of time to allow collection tray 104 to rise to an initial position once the releasing mechanism has released the latch.

In some embodiments when collection tray 104 rises upwards, blocking mechanism 105 may be disabled, and no longer block and/or impede the flow of fluid from fluid supply 101. In some embodiments, a measurement of the field capacity and/or saturation point of the plant growing medium may be calculated by measuring the quantity of fluid supplied to container 102 until blocking mechanism 105 is actuated, minus the quantity of fluid in collection tray 104 and minus the quantity of fluid drained from collection tray 104 during the period of time until blocking mechanism 105 is actuated.

FIG. 4 is a schematic illustration of a top view of a fluid dispenser, in accordance with an embodiment of the current invention.

Apertures

In some embodiments container 102 may comprise a plurality of apertures 410. Water may fall from the aperture 410 onto the surface of the growth medium. Optionally, each aperture may include a flow regulating mechanism. For example, the flow regulating mechanism may be similar to agricultural drip emitter (e.g., a maze, a tortuous channel. In some embodiments, For example, the top of the saturation tester may include a vessel with apertures 410 through with fluid drips onto the surface of the medium. Optionally, the vessel holds water and includes a flow impediment that slows flow to the apertures 410. For example, the impediments may include a plurality of protrusions 411, a porous medium, a closed flow channel (like a agricultural dripper) connected to each aperture, and/or a membrane.

In some embodiments, the plurality of protrusions 411 may include pillars (e.g., vertical protrusions) that take up space in the vessel. For example, the pillars may have a width ranging from 1 to 2 and/or 2 to 3 and/or 3 to 5 mm. Optionally, each pillar ranges between 5 to 15 mm and/or 15 to 25 mm and/or 25 to 100 mm height. The cross section of the pillars may be round and/or square and/or hexagonal etc. Various forces such as capillary forces and/or friction may slow fluid flow through the vessel, and/or flow from the vessel to the apertures 410 and/or flow through the apertures 410 and/or from the apertures to the surface of the medium.

Optionally, the apertures 410 may cause that water rains down at a plurality of points on the surface of the growth medium at a fixed rate that is remains steady even when the fluid pressure head on the distributor 102 changes. For example, a user may pour water onto the distributor 102 such that water ponds on top of the distributor 102. Then water will pass through the apertures 410 at a constant rate and/or spread evenly over the surface of the growth media until the water is exhausted. Alternatively or additionally, distributor 102 may include a screen that distributes the water evenly over space. In some embodiments, slow and/or even distribution of the water over a surface facilitates measuring a fluid capacity of a medium. For example, water may be spread slowly and/or evenly over a surface in such a way that until the medium reaches saturation and/or near saturation there is little drainage and/or when the medium reaches saturation and/or near saturation the rate of drainage will increase very quickly. Optionally, this can be used as a way of measuring a fluid capacity of the medium (e.g., measuring water applied to the medium (e.g., amount applied to the distribute minus the amount of water remaining in the distributor (for example the distributor (e.g., the walls thereof above a screen) may be graduated facilitating measuring amount of water remaining in the distributor)), noting the amount of applied water at the time that the fluid begins to drain quickly, that amount being the fluid capacity of the medium). In some embodiments, e.g., wherein the device is for measuring the fluid capacity of a medium without a plant, there may be no opening 205 and/or a reduced opening 205.

In some embodiments a plurality of apertures 410 may located on a bottom portion of container 102, allowing for fluid contained in container 102 to flow down to vessel 113. Apertures 410 may be round, square, and/or any other shape. In some embodiments the circumference and/or perimeter of apertures 410 may be 0.5-1.0 mm, 1-2 mm, 2-3 mm, 3-4 mm, 4-5 mm, 5-6 mm, 6-7 mm, 7-8 mm, 8-9 mm, 9-10 mm, 10-11 mm, 11-12 mm, 12-15 mm, 15-20 mm, and/or greater than 20 mm.

In some embodiments, the number of apertures may be 1-5, 5-10, 10-20, 20-30, 30-40, 40-50, 50-60, 60-70, 70-100, 100-130, 130-160, 160-200, 200-250, 250-300, 300-400, 400-600, 600-1,000, or more than 1,000. In one embodiment, the number of apertures may be 40.

Optionally, some or all apertures 410 may be arranged within a specific area of container 102. For example, a peripheral area along all sides and/or along curved outer portions of container 102 may be devoid of apertures 410.

In some embodiments a number of apertures may be arranged along a periphery of the specific area, for example 10-40% of all apertures may be located along each side of the specific area.

In some embodiments apertures 410 may be located and/or distributed to provide even dispersion of fluid to a specific size and shape of vessel 113. Optionally a fluid dispenser 200 may comprise a kit comprising pairs of containers 102 and corresponding vessels 103, where each container 102 may comprise locations and/or distribution of aperture 410 to allow even dispersion of fluid to the shape, size, and/or geometry of the corresponding vessel 113.

In some embodiments apertures 410 may be distributed according to an area of container 102, for example 1, 2, 3, 4, 5, or more apertures 410 per square unit of area, for example per square 1-5 mm, 5-10 mm, 1-2 cm, 2-3 cm, 3-4c, 5-6 cm, 6-7 cm, 7-8 cm, 8-9 cm, 9-10 cm, 10-12 cm, 12-14 cm, 14-20 cm, 20-30 cm, 30-40 cm, 40-50 cm, or greater than 50 cm.

Protrusions

In some embodiments a plurality of protrusions 411 may be attached to a bottom surface of container 102. In some embodiments protrusions 411 may protrude substantially vertically, for example to height of about a maximum level of fluid containable within container 102.

In some embodiments, protrusions 411 may regulate and/or reduce and/or control the rate of flow of fluid through apertures 410 due to the physical property of adhesion of fluid to the apertures. For example, the protrusions may create a torturous path which the fluid must pass to reach the apertures.

In some embodiments, protrusions 411 may be of a designed and distribution within container 102 to counteract a greater rate of flow of fluid through apertures 410 when the level of fluid in container 102 is greater, thereby providing a substantially even rate of flow through apertures 410 partially, fully, and/or substantially independent of the level of fluid in container 102.

In some embodiments, additionally or alternatively container 102 may comprise a plurality of drip irrigation mechanisms in addition to and/or instead of said protrusions 411.

In some embodiments, protrusions 411 may be any vertically extended shape, for example a cylinder, a cone, a pyramid, and/or any other vertically extended shape.

In some embodiments, plurality of protrusions 411 may comprise protrusions of more than one shape, for example protrusions along a periphery of container 102 may be shaped differently from protrusions located at an interior location.

In some embodiments the protrusions may extend upwards to a percentage of the height of the highest level of fluid containable within container 102, for example 10-20%, 20-30%, 30-35%, 35-40%, 40-45%, 45-50%, 50-55%, 55-60%, 60-65%, 65-70%, 70-75%, 75-80%, 80-90%, 90-100%, 100-110%.

In some embodiments some or all protrusions 411 may have a greater or lower volume and/or surface area at an upper portion than at a lower portion. For example, protrusions 411 may have the shape of an inverted cone, an inverted pyramid, and/or any other shape with greater or lesser volume or surface area of a lower portion than an upper portion.

In some embodiments, the volume of the protrusions at any given height along their vertical axis may comprise, as a percent of the capacity of liquid volume of container 102 up to the same height, for example 10-20%, 20-30%, 30-35%, 35-40%, 40-45%, 45-50%, 50-55%, 55-60%, 60-65%, 65-70%, 70-75%, 75-80%, 80-90%. In some embodiments the above percentage may vary at different heights. In some embodiments, the percentage may be greater or lower at a higher elevation than at a lower elevation. In some embodiments the percentage may increase with height in a linear, exponential, hyperbolic and or any other mathematical and/or irregular manner. In some embodiments, the percentage may increase or decrease in discrete steps.

Figure 5:
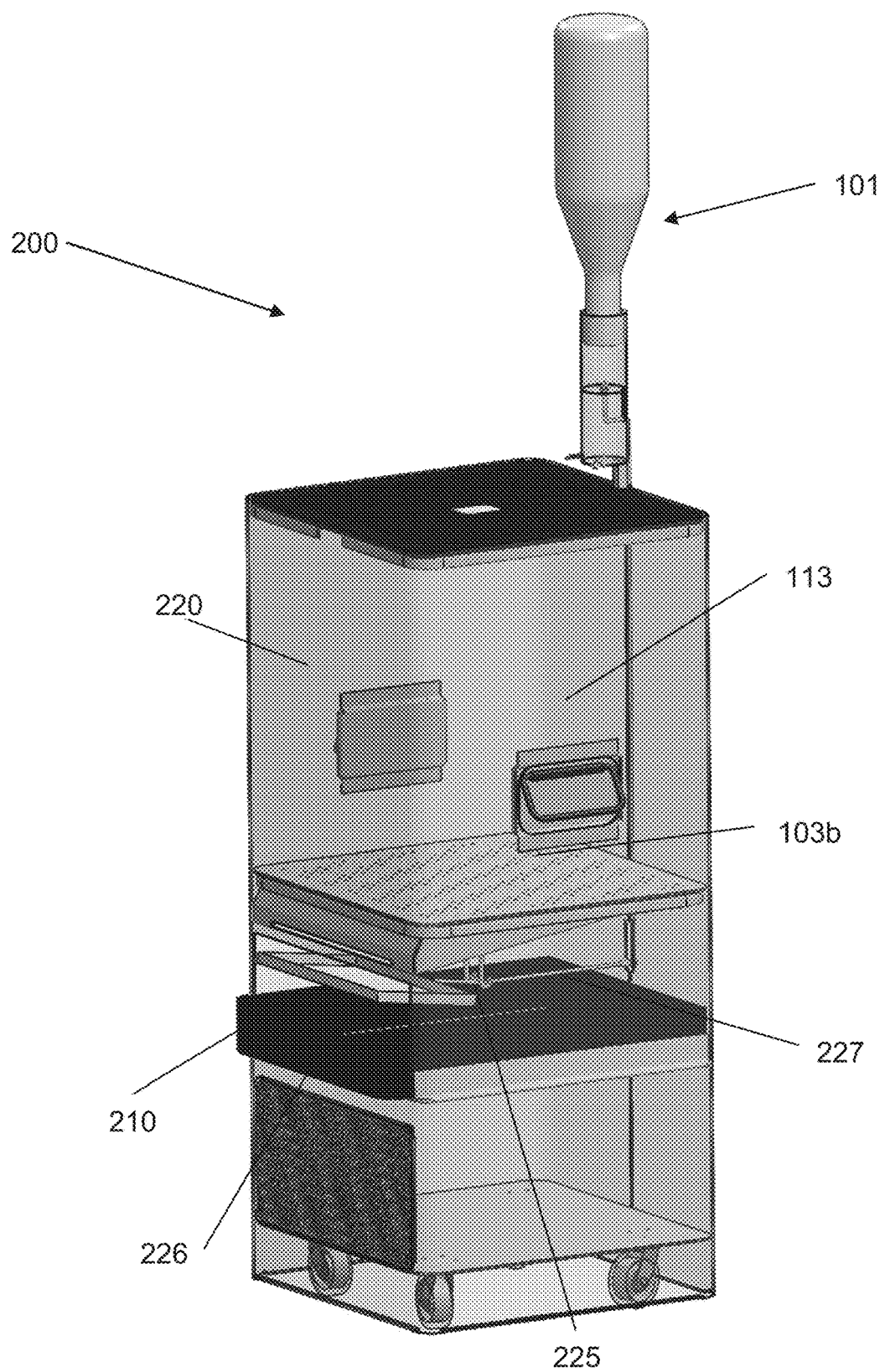
FIG. 5 is a transparent schematic illustration of a fluid dispenser as shown from an angle, according to embodiments of the invention.
Figure 6:
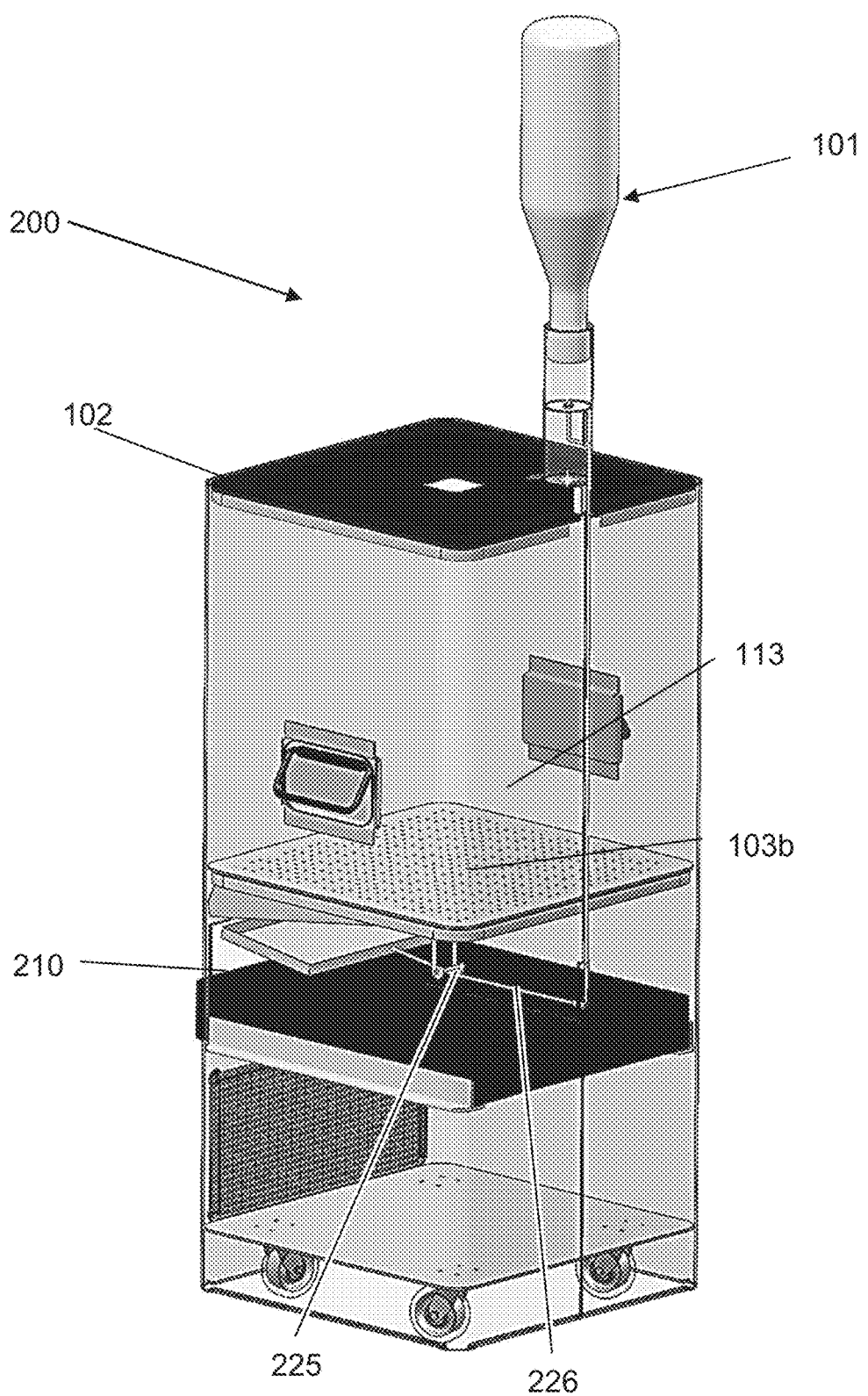
FIG. 6 is a transparent schematic illustration of a fluid dispenser as shown from an angle, according to embodiments of the invention.
Figure 7:
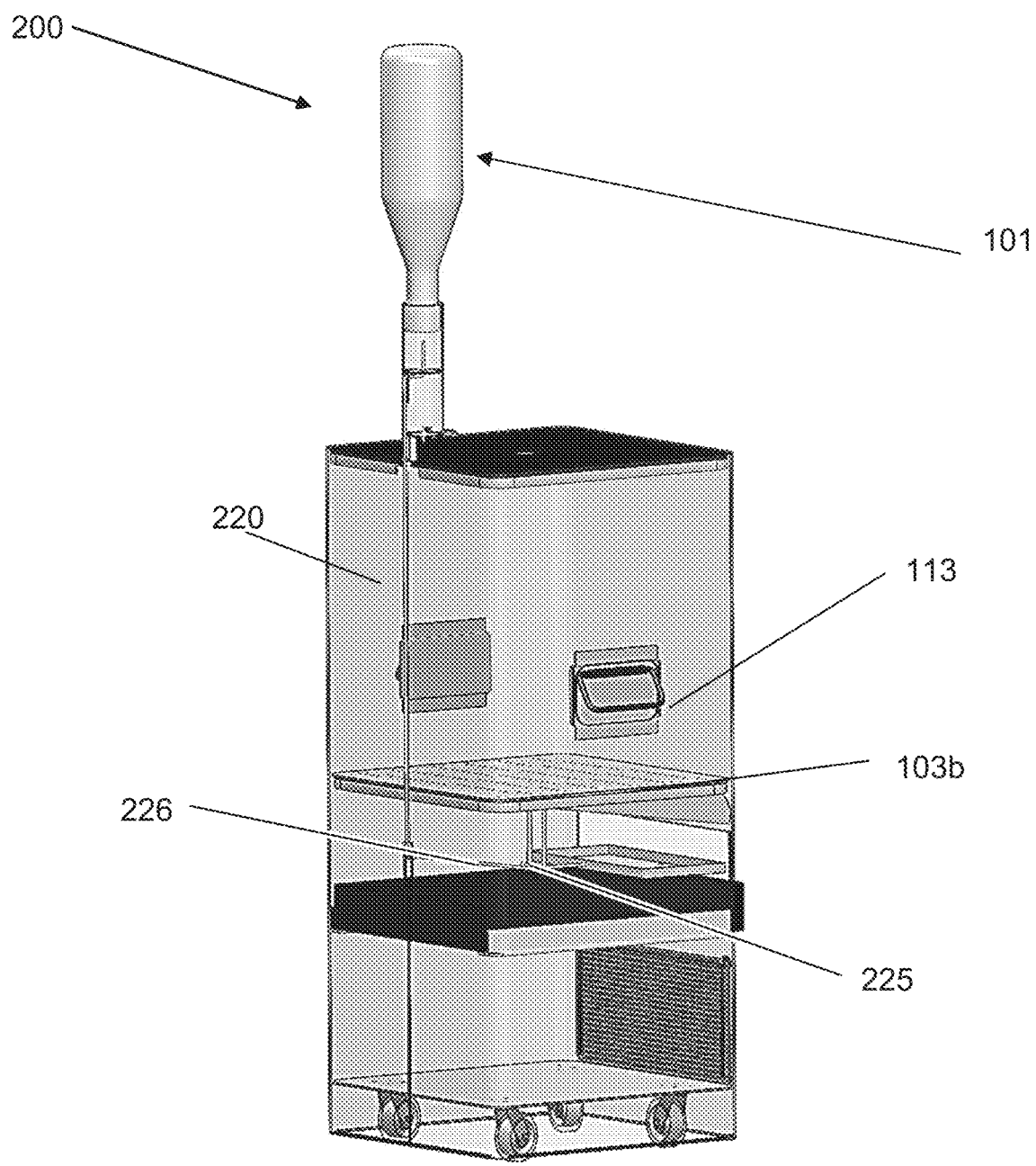
FIG. 7 is a transparent schematic illustration of a fluid dispenser as shown from an angle, according to embodiments of the invention.

FIG. 5, FIG. 6 and FIG. 7 are transparent schematic illustrations of a fluid dispenser as shown from different angles, according to embodiments of the invention.

Figure 8:
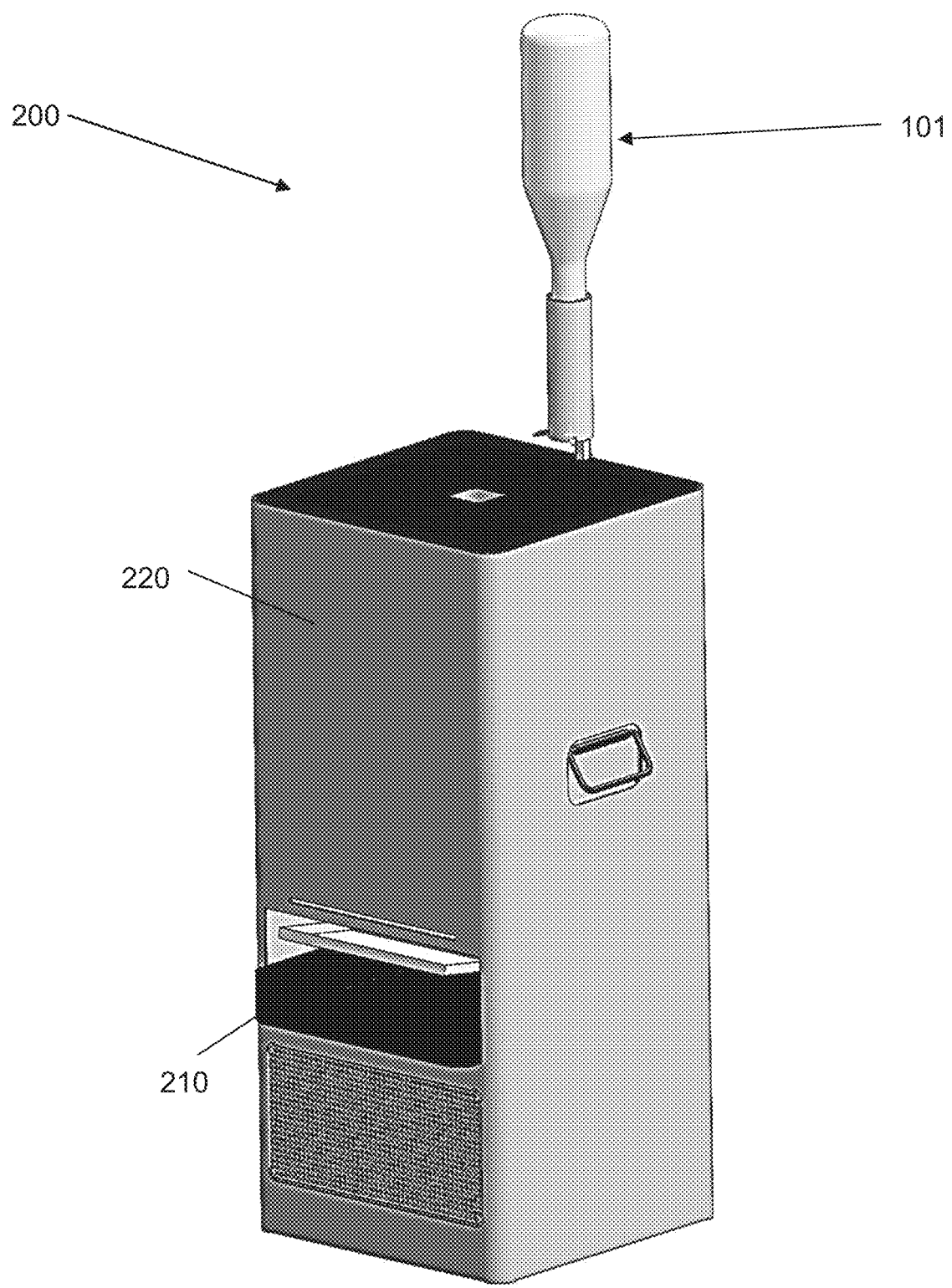
FIG. 8 is a schematic drawing of a fluid dispenser as seen from an angle, according to embodiments of the invention.
Figure 9:
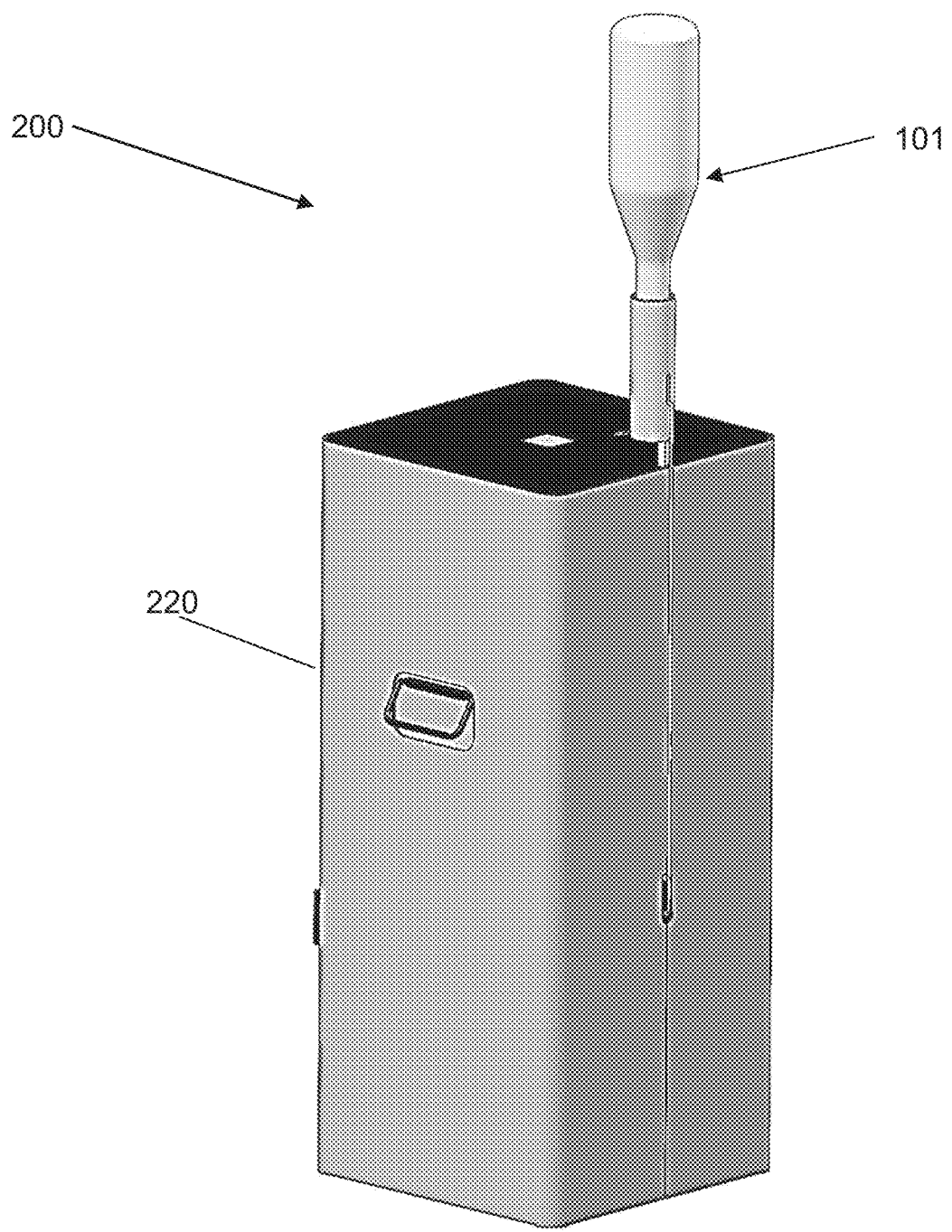
FIG. 9 is a schematic drawing of a fluid dispenser as seen from an angle, according to embodiments of the invention.

FIG. 8 and FIG. 9 are schematic drawings of a fluid dispenser as seen from different angles, according to embodiments of the invention.

Figure 10:
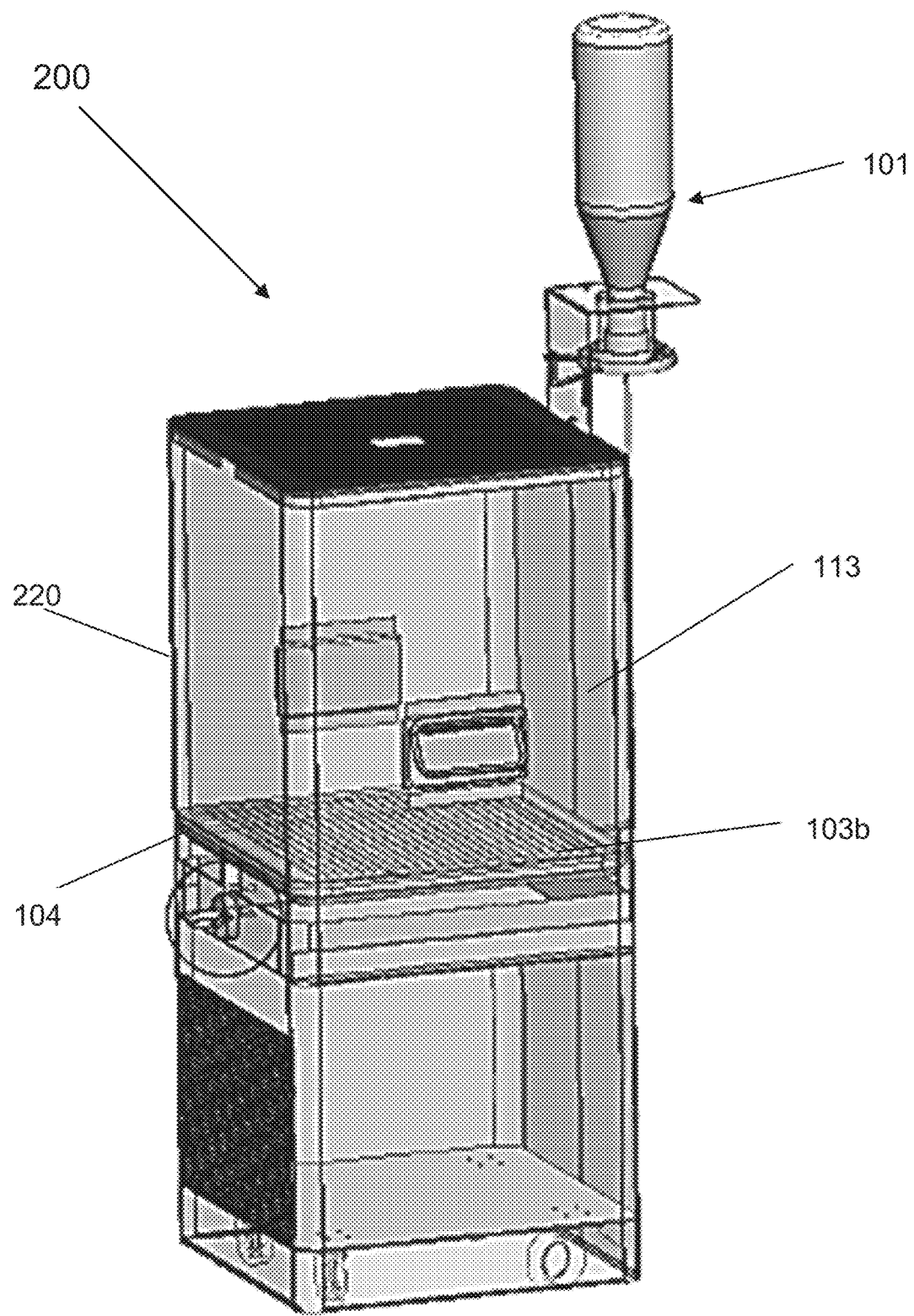
FIG. 10 is a schematic illustration of a side angle view of a fluid dispenser, in accordance with an embodiment of the current invention.

FIG. 10 is a schematic illustration of a side angle view of a fluid dispenser, in accordance with an embodiment of the current invention.

Figure 12:
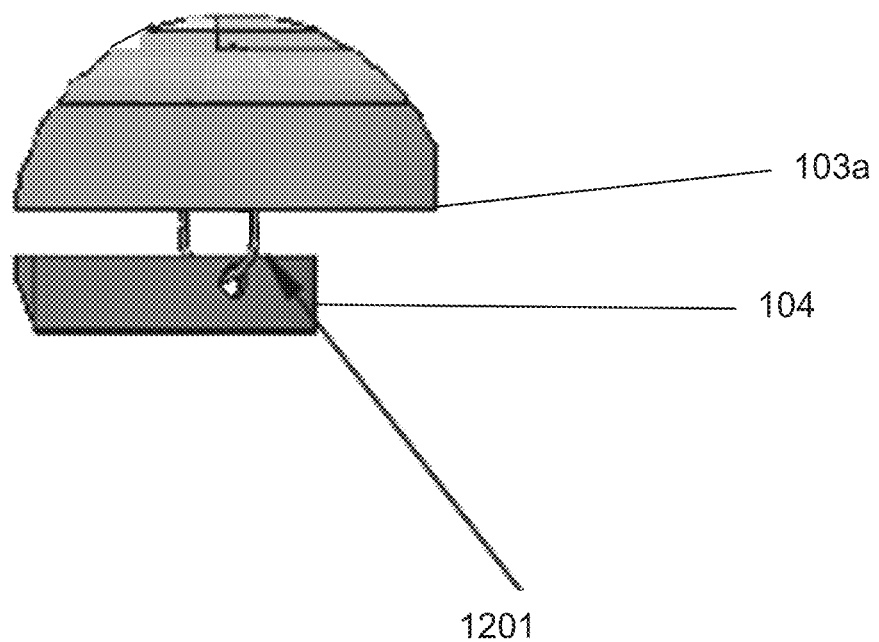
FIG. 12 is a schematic illustration of a close-up side view of a tray suspended under a bottom surface, in accordance with an embodiment of the current invention.

In some embodiments, collection tray 104 may be elastically suspended beneath bottom surface 103a, e.g., as shown in FIG. 12.

FIG. 11 is a schematic illustration of a latching mechanisms, in accordance with an embodiment of the current invention.

In some embodiments the latching mechanism may comprise a transforming mechanism that transforms the vertical displacement of tray 104 into rotational motion of a latch. For example, tray 104 may be connected to lever 1101, such that lever 1101 is displaced downward when tray 104 is displaced downward, for example by the weight of collected fluid. Lever 1101 may be connected by a transforming mechanism to latch 1102, such that downward motion of lever 1101 causes latch 1102 to rotate along an axis substantially parallel to the downward motion of lever 1101. When tray 104 is downwardly displaced below the level of latch 1102, latch 1102 may be rotated sufficiently to protrude above tray 104, thereby latching tray 104 and preventing a return upwards to an original position when the collected fluid is partially or fully evacuated.

Optionally, the transforming mechanism may be any mechanism or combination of mechanisms that transforms vertical displacement to rotational motion, for example a gear and worm drive, a nut and bolt, a ball screw, a rod and crank, helical gears, bevel and miter gears, perpendicular bevel gears, vertical and horizontal gears and/or wheels, rack and screw, and/or the like.

Optionally, latch 1102 may be connected to a releasing mechanism, for example releasing mechanism 1103. Optionally releasing mechanism 1103 may comprise a timing mechanism, for example a clepsydra, a water clock, a mechanical wind-up timer, an electrical timer, and/or any other timing mechanism that may cause latch 1102 to rotate at a pre-determined time. Optionally releasing mechanism 1103 may be actuated by a timing mechanism to unlatch tray 104, allowing tray 104 to rise to an original position.

Optionally tray 104 may be connected to connector 202 by a mechanism that translates downward displacement of tray 104 into upward force and/or motion acting on connector 202, thereby actuating blocking mechanism 105. The translating mechanism may be any mechanical and/or electrical mechanism that translates downward displacement to upward force and/or motion, for example a solenoid, a gear set, a lever, and/or a fulcrum, for example fulcrum 225.

FIG. 12 is a schematic illustration of a close-up side view of a tray suspended under a bottom surface, in accordance with an embodiment of the current invention.

In some embodiments, collection tray 104 may be elastically suspended beneath a bottom side of bottom surface 103a, for example by suspension 1201. Suspension 1201 may be for example springs, rubber, and/or any other elastic and/or other material and/or mechanism that elongates due to a force, for example weight of water in collection tray 104, and return to a substantially original unelongated shape and/or position when the force is reduced and/or removed.

In some embodiments, suspension 1201 may comprise four instantiations, for example located near four corners of tray 104. In some embodiments, suspension 1201 may comprise more than four instantiations, for example 5, 10, 15, 20, 30, 40, 50, and/or any other number of elastic connections between a bottom side of bottom surface 103a and tray 104

Figure 13:
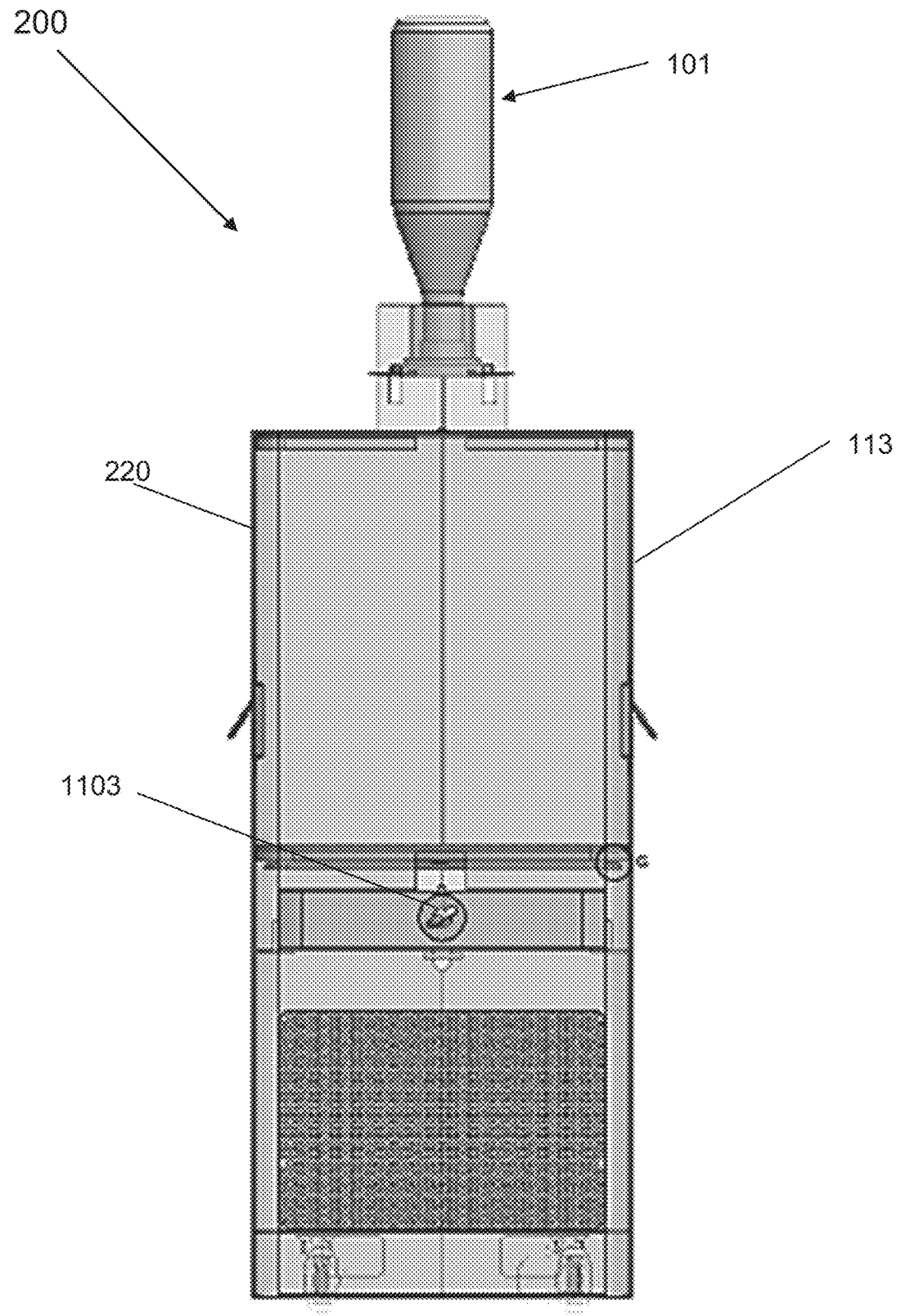
FIG. 13 is a schematic illustration of a side view of a fluid dispenser with a timing mechanism, in accordance with an embodiment of the current invention.

FIG. 13 is a schematic illustration of a side view of a fluid dispenser with a timing mechanism, in accordance with an embodiment of the current invention.

Figure 14:
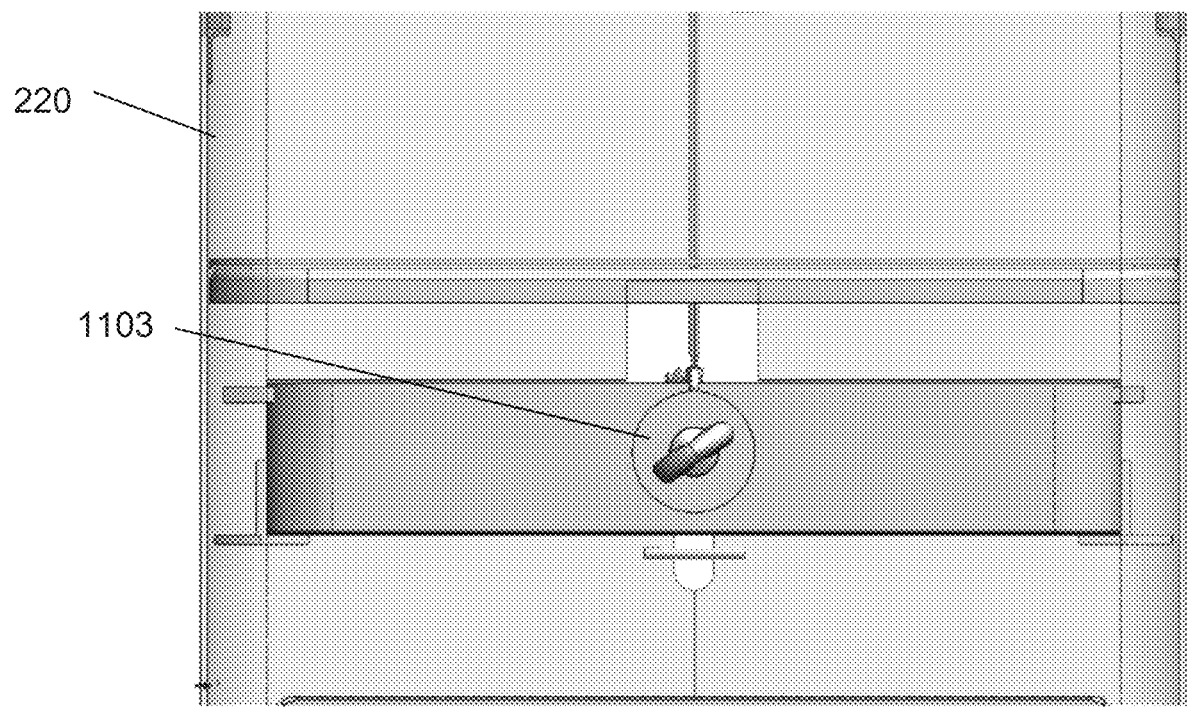
FIG. 14 is a schematic illustration of a close-up side view of a fluid dispenser timing mechanism, in accordance with an embodiment of the current invention.

FIG. 14 is a schematic illustration of a close-up side view of a fluid dispenser timing mechanism, in accordance with an embodiment of the current invention.

Figure 15:
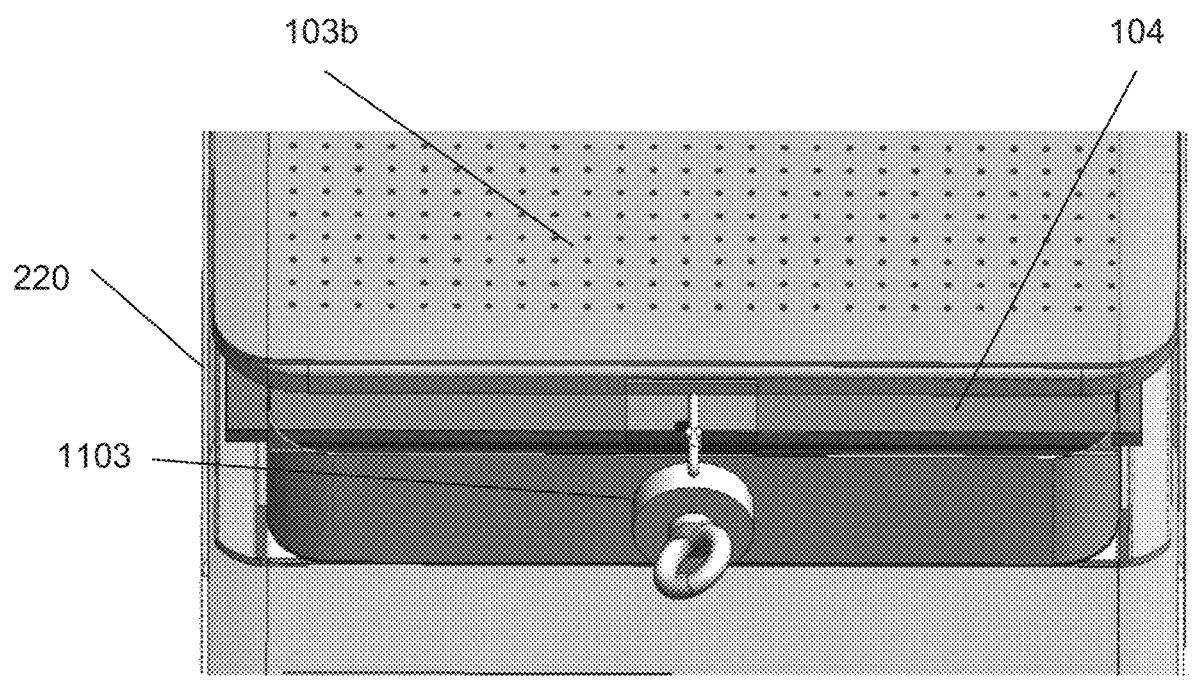
FIG. 15 is a schematic illustration of a close-up top angle cutaway view of a fluid dispenser timing mechanism, in accordance with an embodiment of the current invention.

FIG. 15 is a schematic illustration of a close-up top angle cutaway view of a fluid dispenser timing mechanism, in accordance with an embodiment of the current invention.

Figure 16:
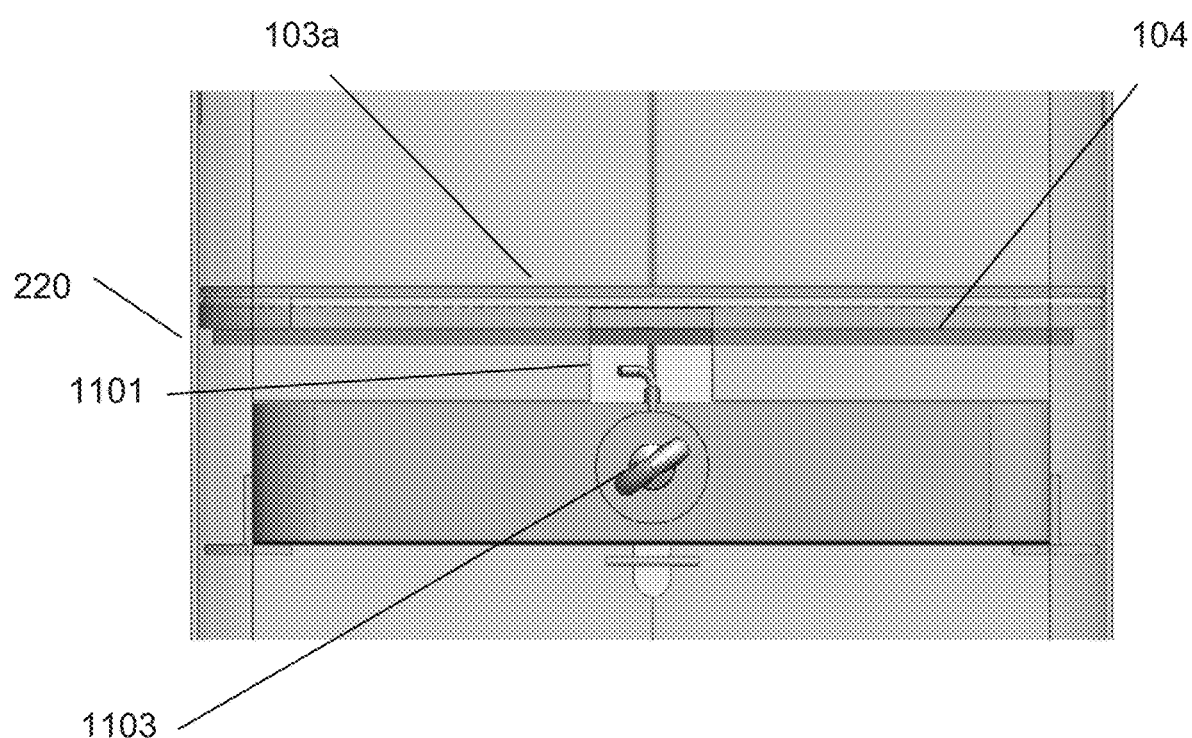
FIG. 16 is a schematic illustration of a close-up side view of a fluid dispenser timing mechanism, in accordance with an embodiment of the current invention.

FIG. 16 is a schematic illustration of a close-up side view of a fluid dispenser timing mechanism, in accordance with an embodiment of the current invention.

Figure 17:
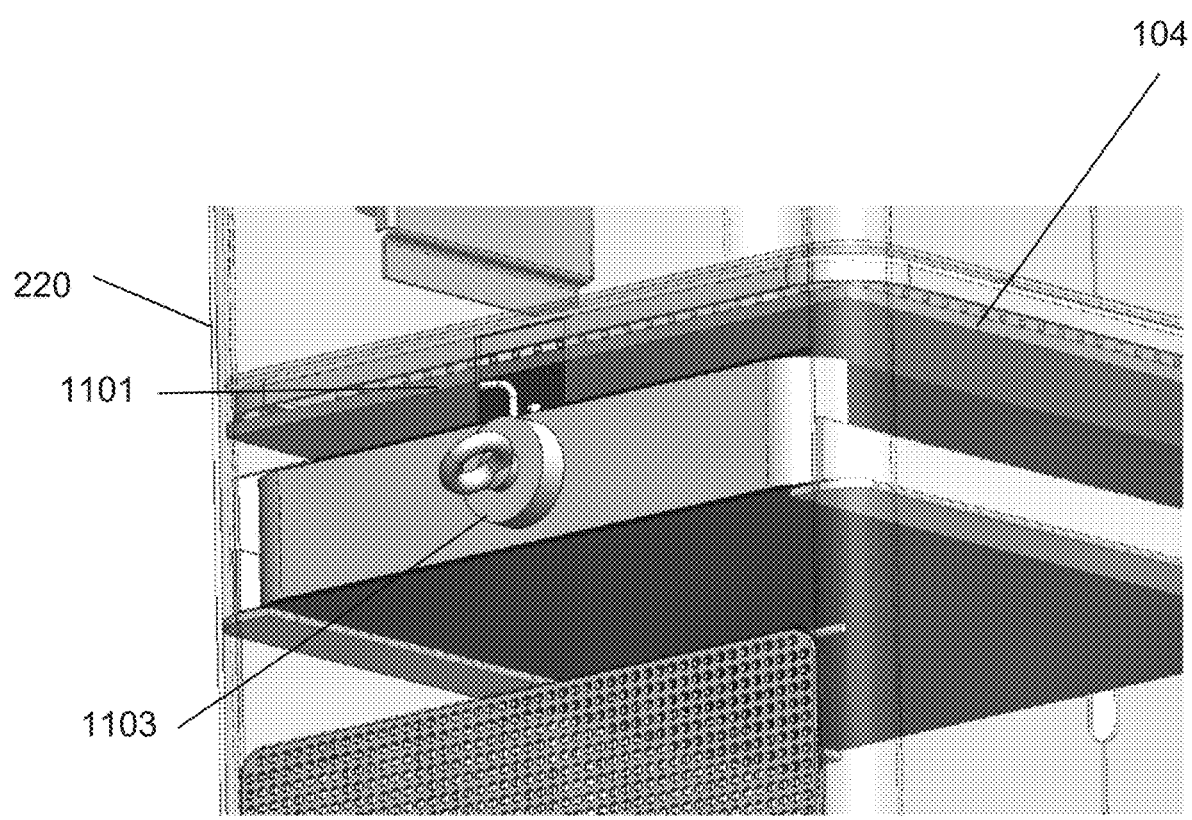
FIG. 17 is a schematic illustration of a close-up side and bottom angle view of a fluid dispenser timing mechanism, in accordance with an embodiment of the current invention.

FIG. 17 is a schematic illustration of a close-up side and bottom angle view of a fluid dispenser timing mechanism, in accordance with an embodiment of the current invention.

Figure 18:
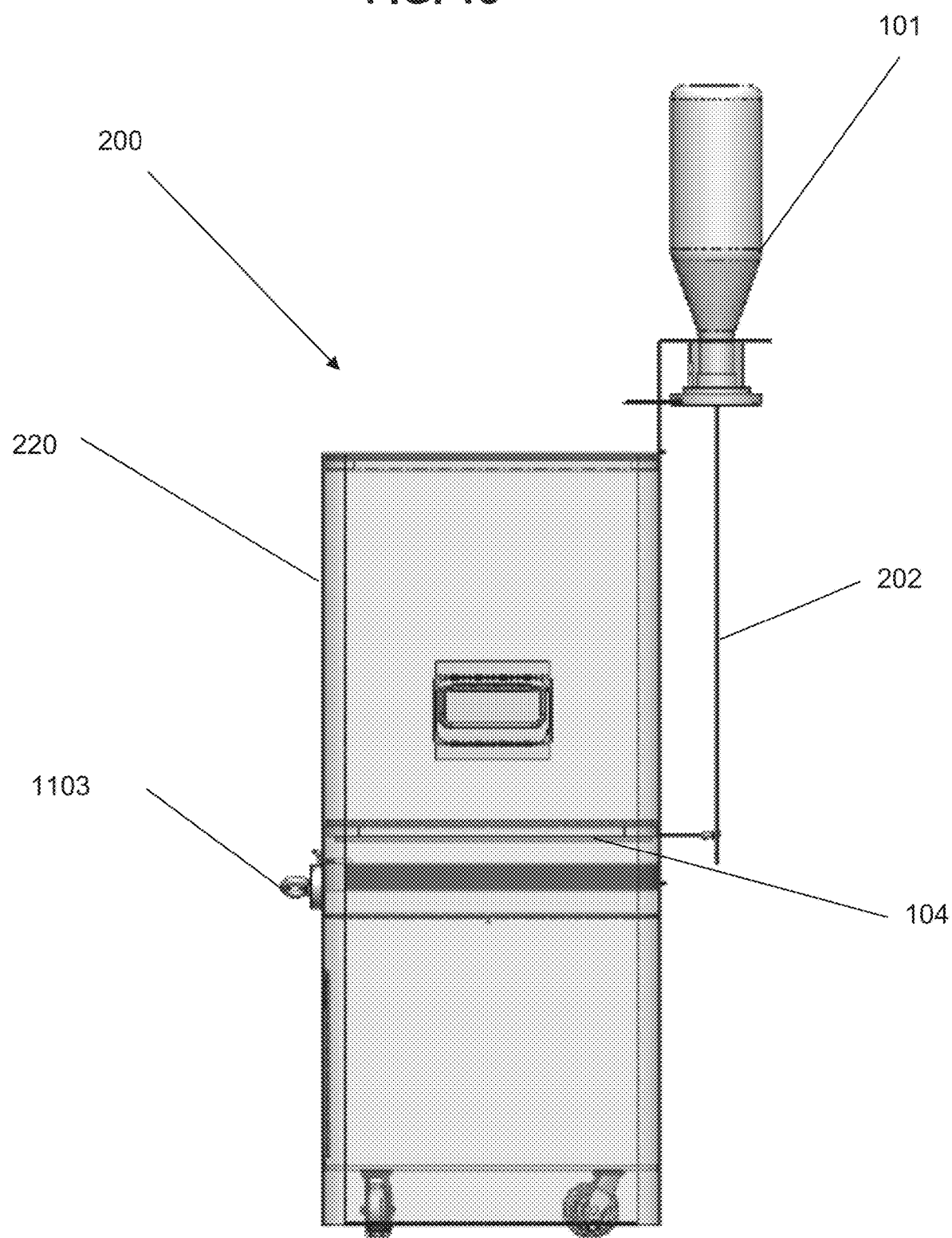
FIG. 18 is a schematic illustration of a side view of a fluid dispenser with a timing mechanism, in accordance with an embodiment of the current invention.

FIG. 18 is a schematic illustration of a side view of a fluid dispenser with a timing mechanism, in accordance with an embodiment of the current invention.

Figure 19:
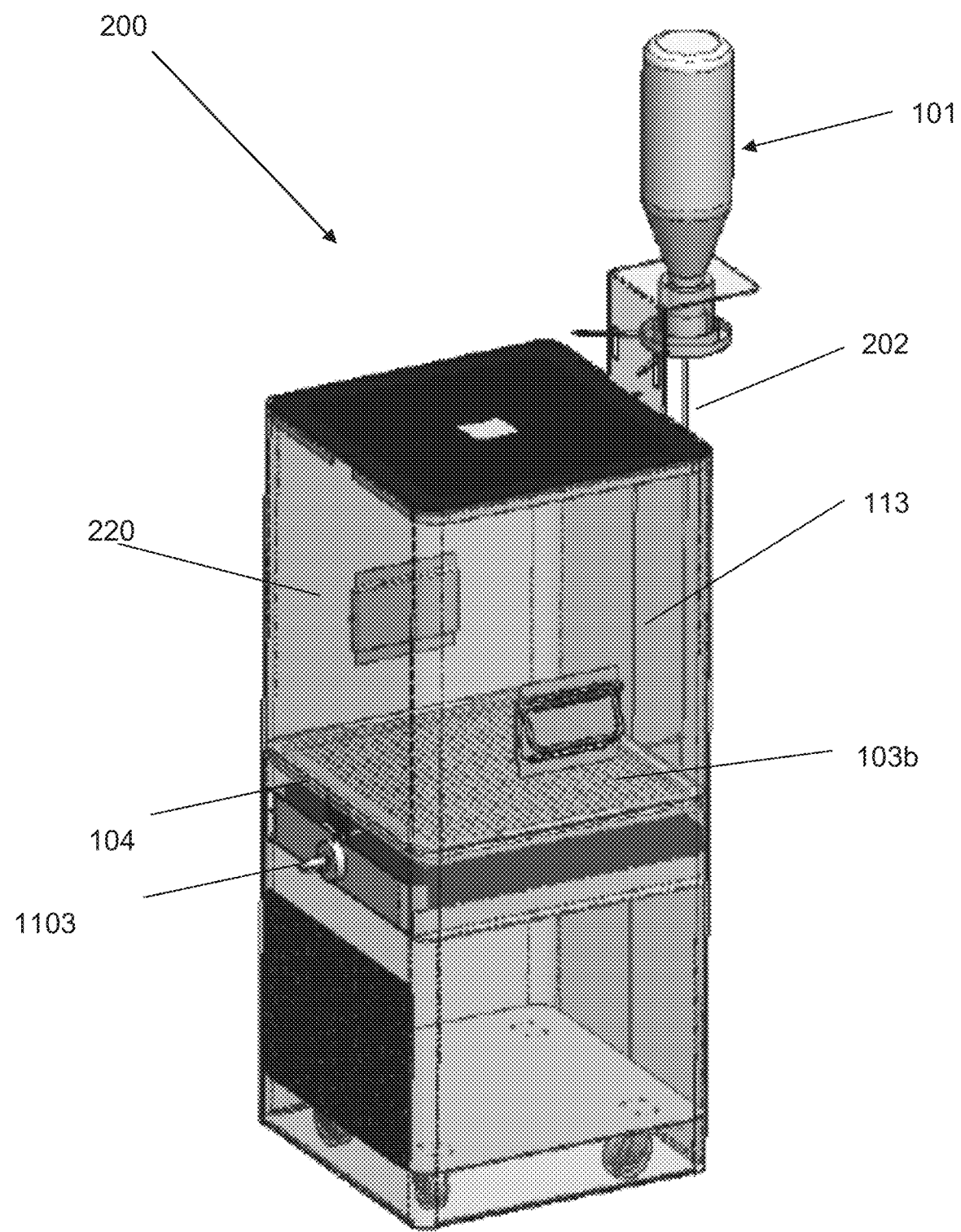
FIG. 19 is a schematic illustration of a side and top angle view of a fluid dispenser, in accordance with an embodiment of the current invention.

FIG. 19 is a schematic illustration of a side and top angle view of a fluid dispenser, in accordance with an embodiment of the current invention.

Figure 20:
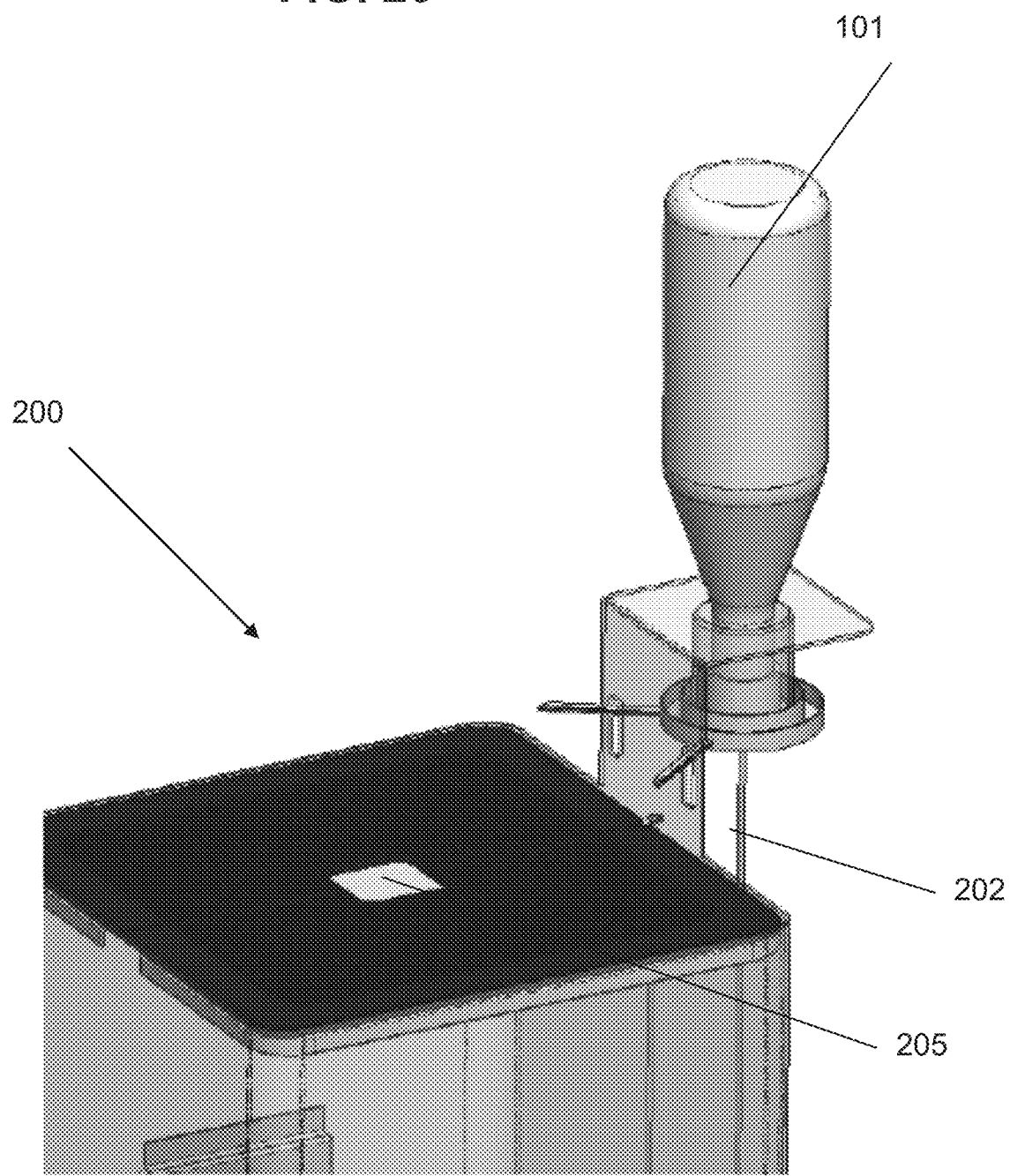
FIG. 20 is a schematic illustration of a close-up of a side and top angle view of a fluid dispenser timing mechanism, in accordance with an embodiment of the current invention.

FIG. 20 is a schematic illustration of a close-up of a side and top angle view of a fluid dispenser timing mechanism, in accordance with an embodiment of the current invention.

Figure 21:
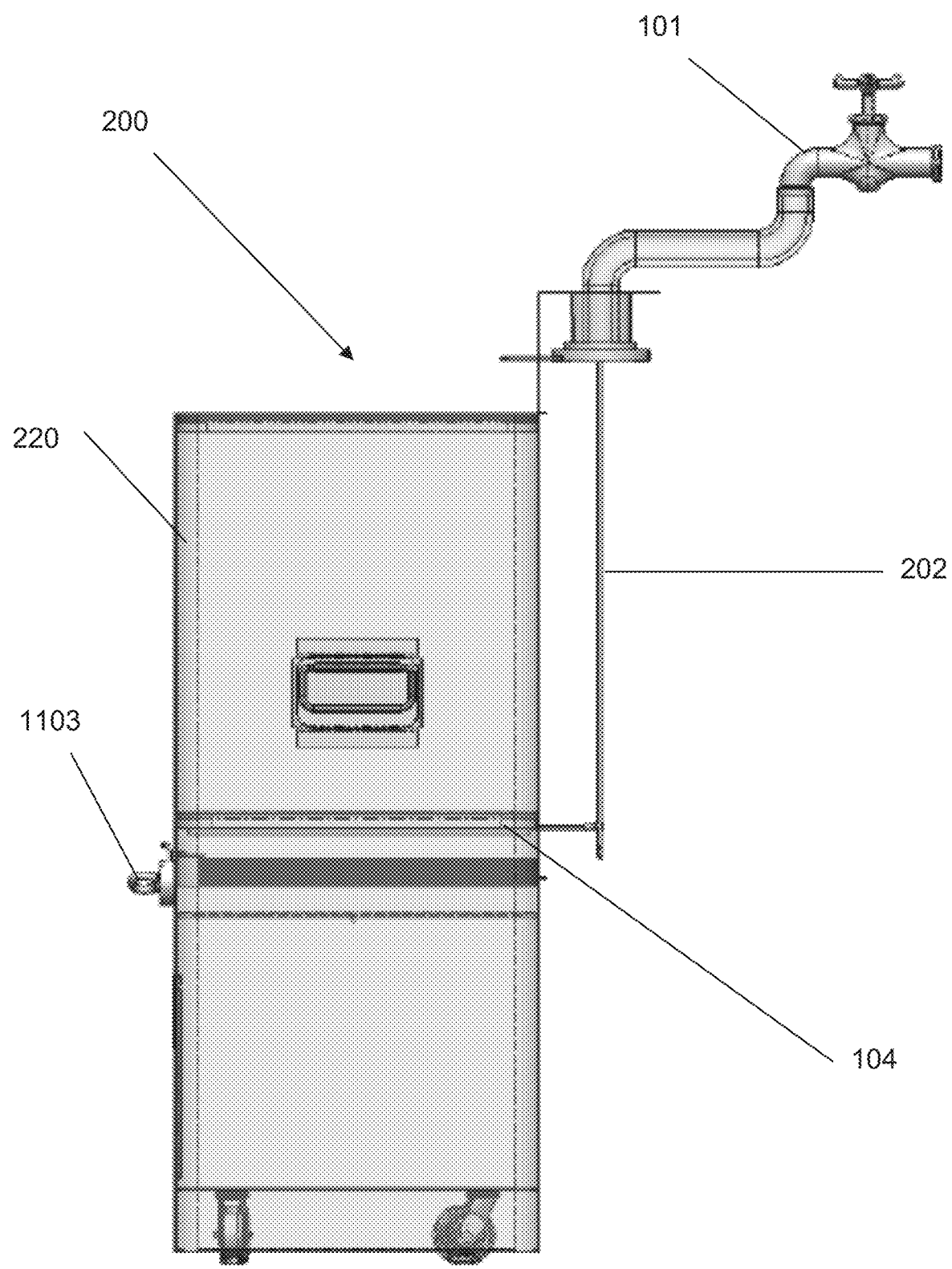
FIG. 21 is a schematic illustration of a side view of a fluid dispenser with a flowing fluid source, in accordance with an embodiment of the current invention.

FIG. 21 is a schematic illustration of a side view of a fluid dispenser with a flowing fluid source, in accordance with an embodiment of the current invention.

In some embodiments of the present invention, fluid source 101 may comprise a faucet, valve, and/or any other flow control mechanism connected to a fluid supply and/or any other source of flowing fluid.

Figure 22:
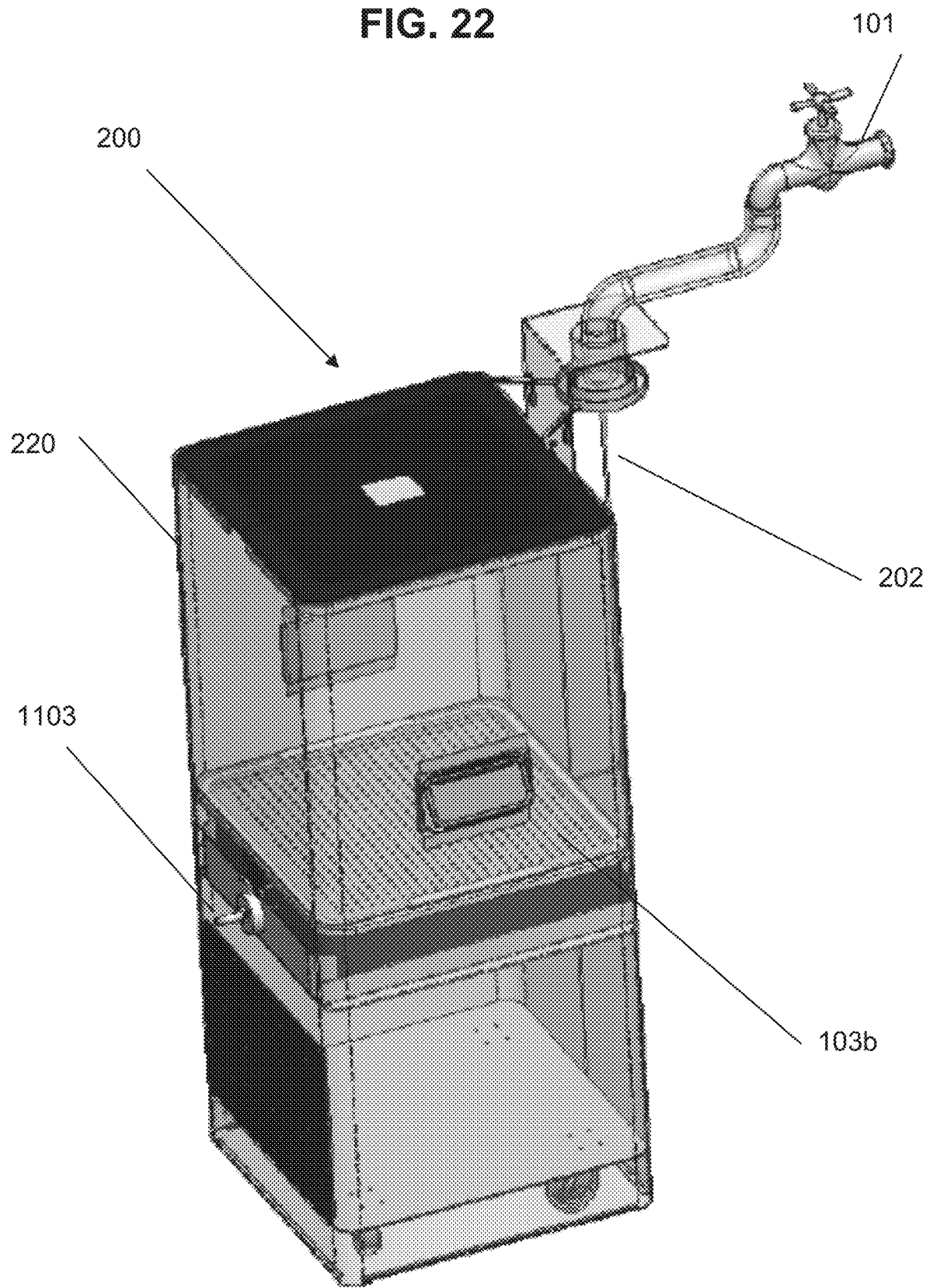
FIG. 22 is a schematic illustration of a top and side angle view of a fluid dispenser with a flowing fluid source, in accordance with an embodiment of the current invention.

FIG. 22 is a schematic illustration of a top and side angle view of a fluid dispenser with a flowing fluid source, in accordance with an embodiment of the current invention.

Figure 23:
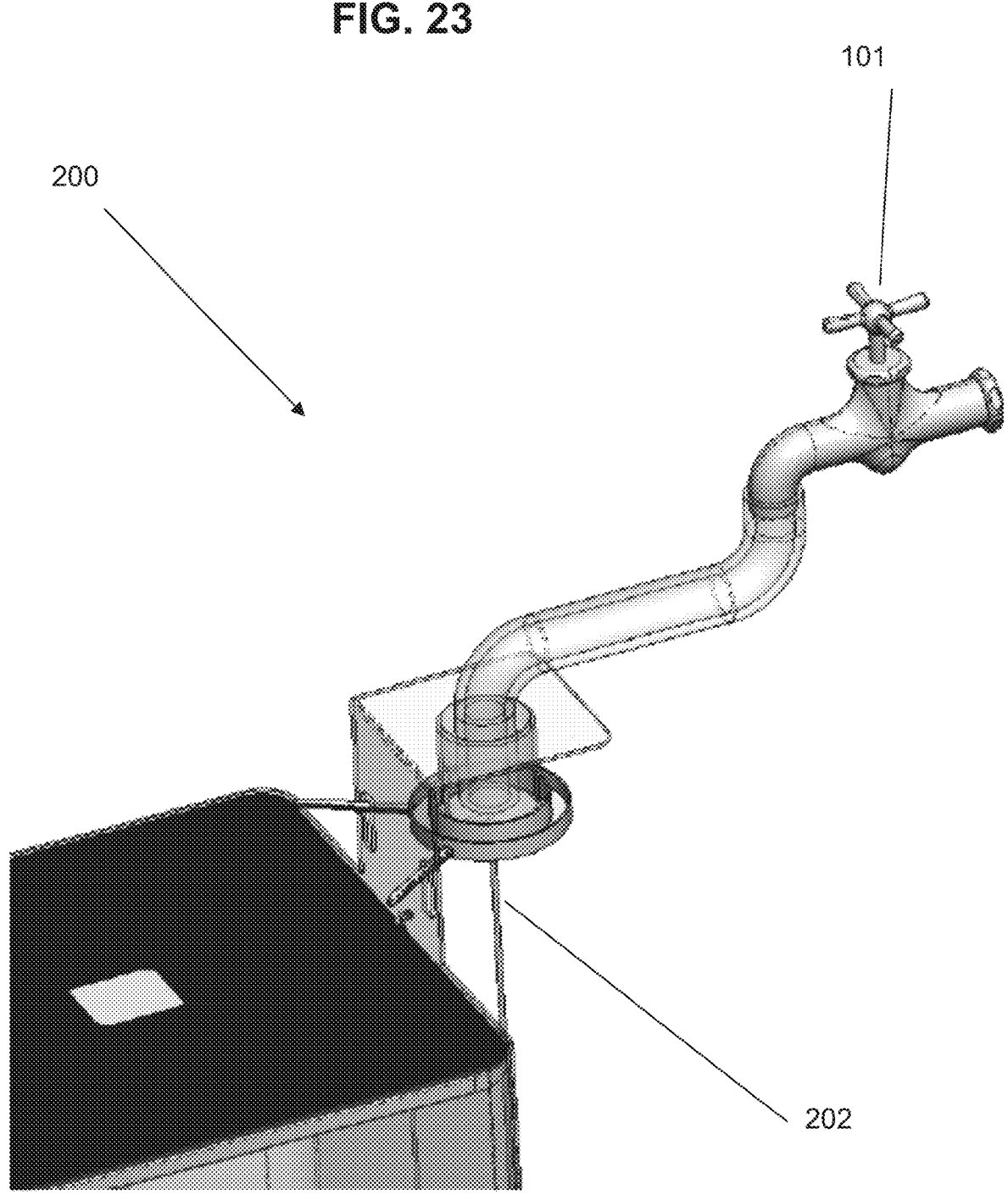
FIG. 23 is a schematic illustration of a close-up top and side view of a fluid dispenser with a flowing fluid source, in accordance with an embodiment of the current invention.

FIG. 23 is a schematic illustration of a close-up top and side view of a fluid dispenser with a flowing fluid source, in accordance with an embodiment of the current invention.

Figure 24:
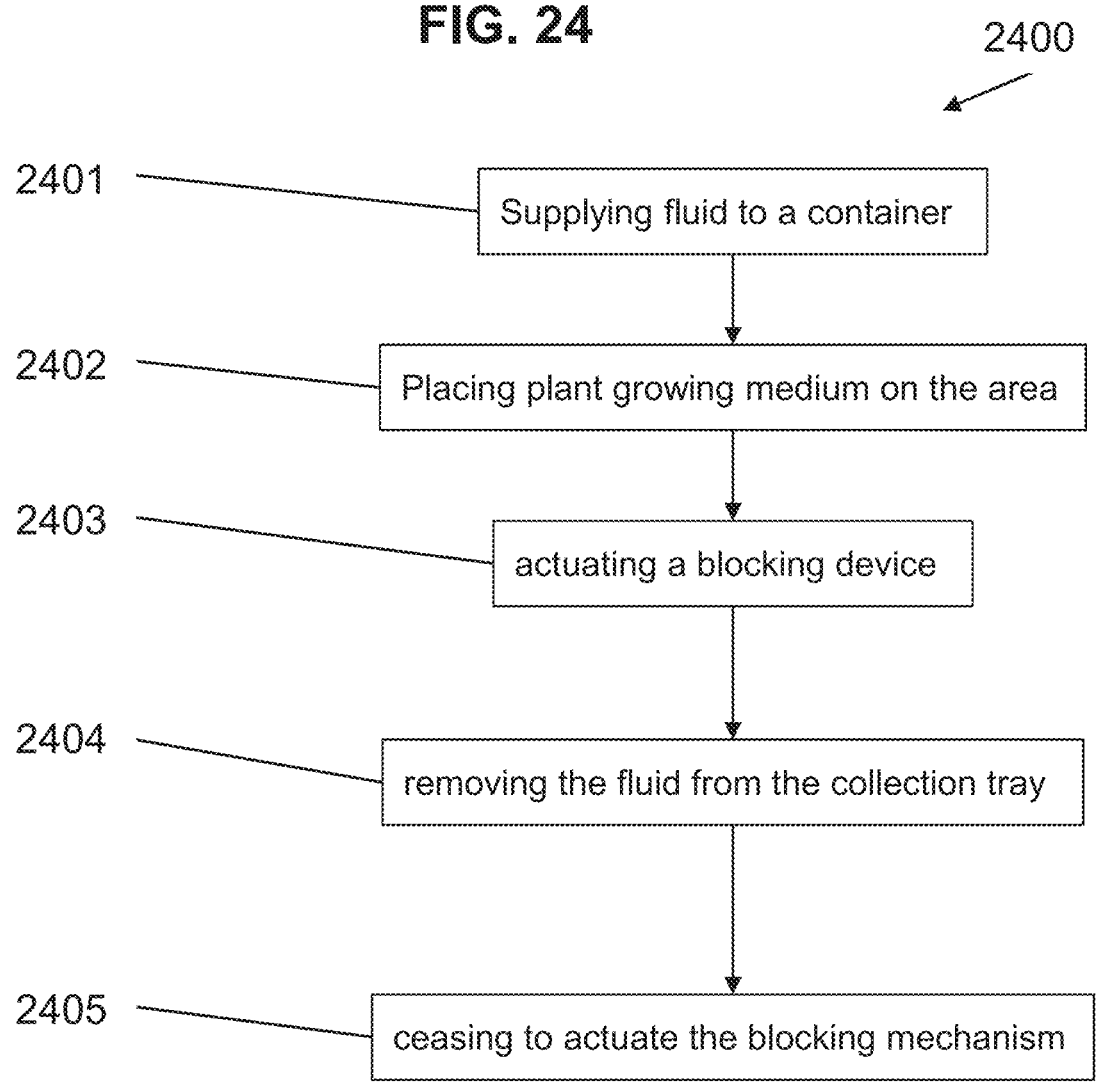
FIG. 24 is a flow chart of a method of using a fluid dispenser, according to embodiments of the invention.

FIG. 24 is a flow chart of a method of using a fluid dispenser, according to embodiments of the invention.

In some embodiments, a method 2400 of dispensing a fluid may comprise some or all of the following steps:

2401 Supplying fluid to a container controlling a flow of the fluid to an area below the container.

2402 Placing plant growing medium on the area, the area drainable into a collection tray;

2403 actuating a blocking device to impede the fluid supply when a quantity of fluid in the collection tray is above a threshold value;

2404 removing the fluid from the collection tray over a period of time; and

2405 ceasing to actuate the blocking mechanism when a quantity of fluid in the collection tray is reduced to below the threshold value.

In some embodiments of the invention, the method of using fluid dispenser may comprise one or more additional steps, for example: measuring an amount of fluid supplied to the area by the fluid supply until the blocking mechanism is actuated, placing a live plant with the plant growing medium of the area, adjusting a valve, tap, and/or faucet to adjust a rate of flow of fluid from a fluid supply to the container.

Manual System

Figure 25:
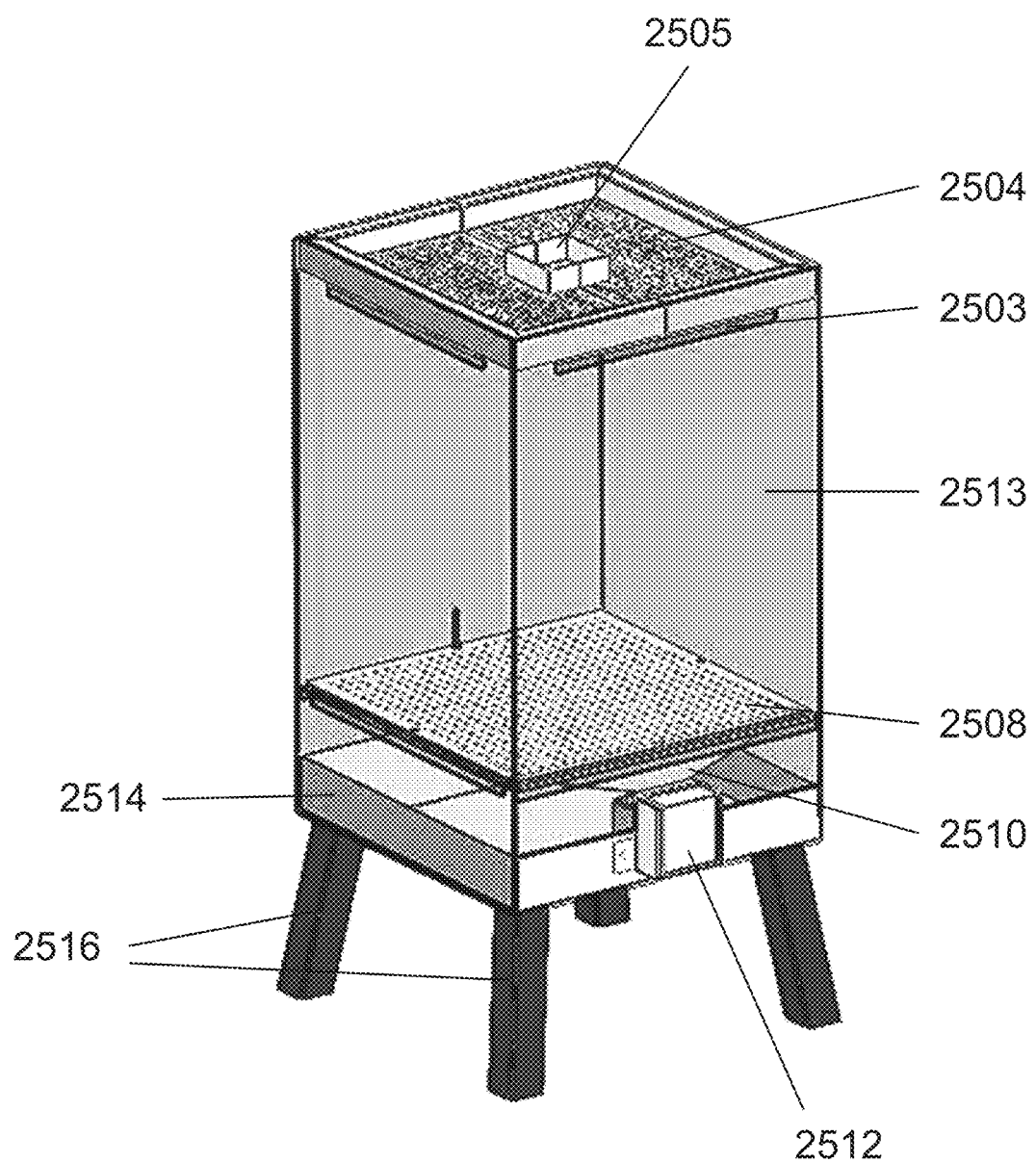
FIG. 25 is a perspective view of a plant watering system in accordance with an embodiment of the current invention.
Figure 32:
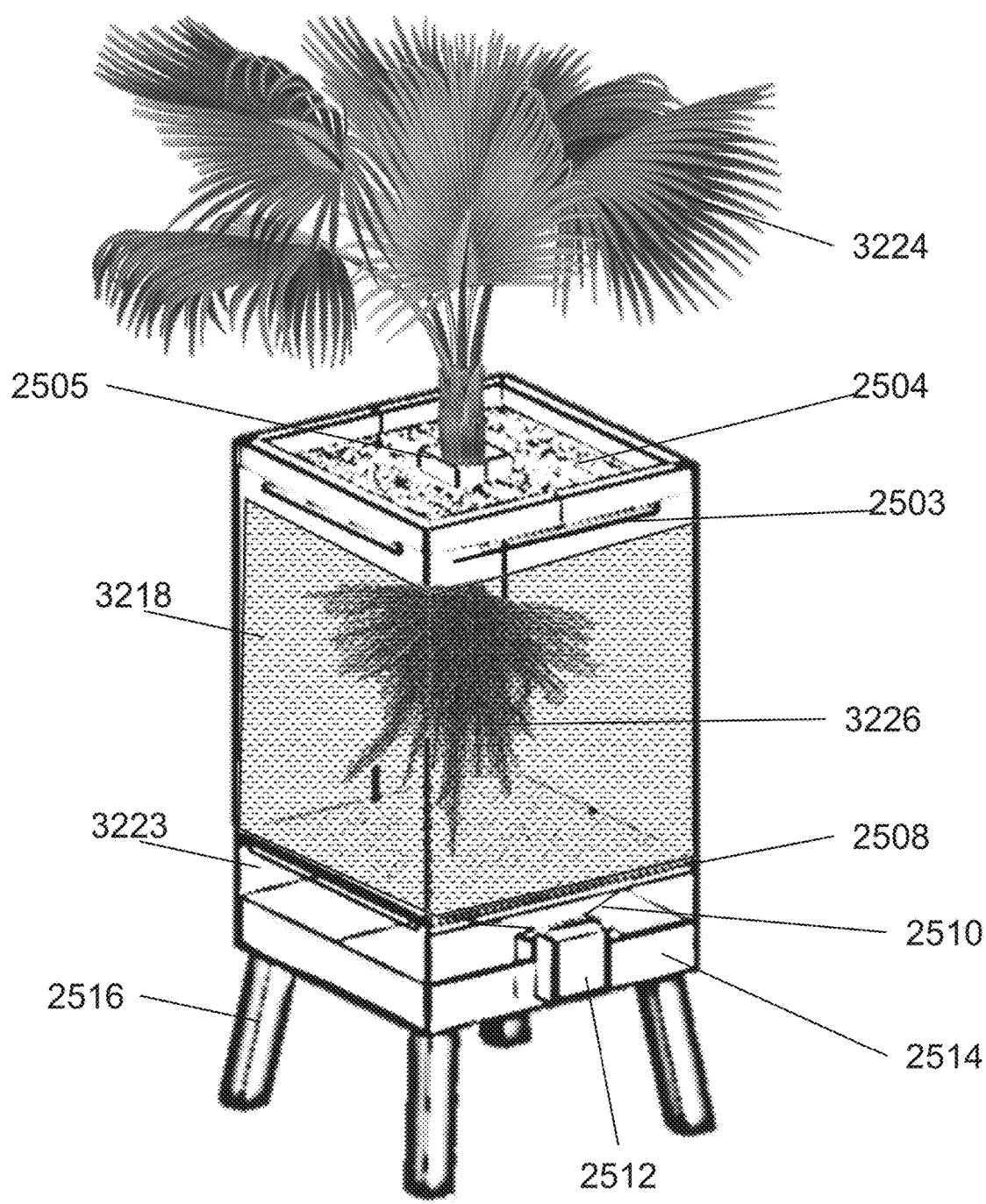
FIG. 32 is a schematic perspective view of a planter in use in accordance with an embodiment of the current invention.

FIG. 25 illustrates a cut away view of a plant watering system in accordance with an embodiment of the invention. A manual plant watering system may include an enclosure 2513 (e.g., similar to vessel 113). Optionally, a plant growth medium (e.g., soil) is placed in enclosure 2513 and/or a plant is planted and/or takes root therein (e.g., as illustrated in FIG. 32). In some embodiments, a water distributor (for example a screen) is positioned above the growth medium. For example, when water is poured onto the top of the planter (e.g., onto the distributor) it is distributed substantially evenly over the top of the growth medium. Additionally or alternatively, the distributor may control the rate of water distribution to the growth medium. For example, the distributer may slow gravity flow of the water such that enough water to saturate the soil take between 2 to 30 seconds and/or between 30 sec to 2 minutes and/or between 2 minutes to 10 minutes and/or between 10 minutes to 40 minutes and/or between 30 minutes to 2 hours to reach the growth medium.

In some embodiments the distributor may include one or more openings 2505. For example, the stem of one or more plants may grow through the opening 2505. Optionally, the distributor sits on a support 2503 (for example, a projection from one or more walls of the enclosure 2513). For example, the support 2503 may suspend the distributor above the top surface of the growth medium. For example, the distributor may be held between 1 mm and 1 cm and/or between 1 cm to 5 cm and/or between 5 cm to 20 cm and/or between 20 cm to 1 m and/or between 1 m to 5 m above the surface of the growth medium.

In some embodiments, the distributor 2503 may include apertures connected to regulators, for example as illustrated and/or described above in connection with apertures 410. For example, this may facilitate even application of water evenly over the water over the surface at a constant controlled rate of the growth medium even when water pools on the distributor.

In some embodiments, the planter will include a floor 2508. Optionally, floor 2508 will support the growth medium while allowing water to drain by gravity. For example, the floor may include drainage holes that allow water to pass therethrough. Optionally, water passing through floor 2508 is directed by a funnel 2510 to a water level indicator 2512 and/or a drainage reservoir 2514. For example, the drainage reservoir 2514 may include a small compartment (e.g., a glass cup of any shape (e.g., square, round, tapered) that fills faster than the reservoir 2514. For example, when the growth medium becomes saturated water may drain into the monitor 2512. Optionally, the monitor 2512 due to its relatively small volume fills quickly and/or is a sensitive measure for the rate of drainage. Optionally, the water level in the indicator is visible from outside the planter (e.g., the walls of the indicator may include a transparent portion and/or the monitor 2512 may be positioned so that a user can see the level of the water through the top of the monitor 2512. The planter optionally includes a stand 2516.

Figure 27A:
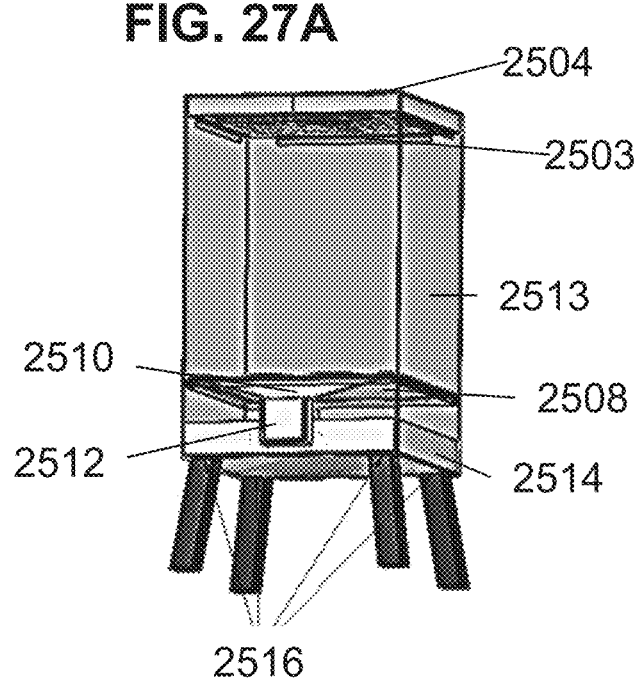
FIG. 27A is a perspective view of a plant watering system in accordance with an embodiment of the current invention.
Figure 27B:
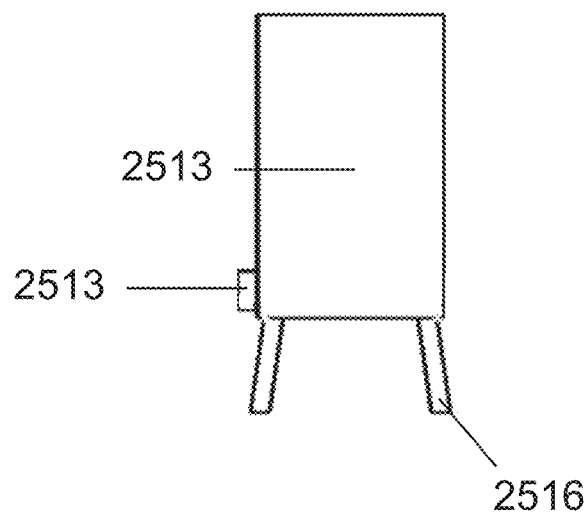
FIG. 27B is a side view of a plant watering system in accordance with an embodiment of the current invention.
Figure 27C:
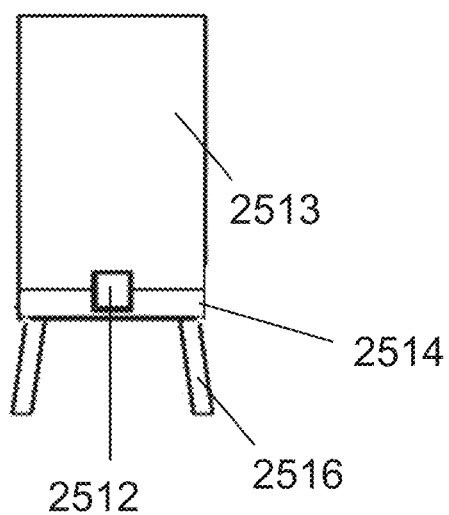
FIG. 27C is a side view of a plant watering system in accordance with an embodiment of the current invention.

FIGS. 26A-26D illustrate several views (26A. side view, 26B. side view, 26C. top view, and 26D. perspective view) of a plant watering system in accordance with an embodiment of the invention. FIG. 27 illustrates several views (27A. cut away view, 27B. side view, and 27C. side view) of a plant watering system in accordance with an embodiment of the invention.

FIG. 28A is an exploded view of a plant watering system with a water drainage reservoir in an open position in accordance with an embodiment of the current invention. In some embodiments, the distributor 2504 and/or opening 2505 may be made in multiple pieces. For example, this may make it easier to remove and/or replace when a plant is growing in the planter. Optionally, there may be supports 2507 for the floor 2508. For example, supports 2507 may include protrusions from the walls of the enclosure 2513. In some embodiments, reservoir 2514 may be designed to be removed, replaced and/or emptied. For example, reservoir 2514 may be in the form of a drawer that can be pulled out and/or pushed into the planter, for example as illustrated in FIG. 28A. Alternatively or additionally, reservoir 2514 may include a drain.

FIG. 28B is a view of a plant watering system with a water drainage reservoir 2514 in a closed position in accordance with an embodiment of the current invention. In some embodiments, the user may check the water level in the drainage reservoir using a water level indicator 2512 which may include, for example, a window into the reservoir 2514. Alternatively or additionally, the user may check the water level by opening the drainage reservoir 2514. For example, the drainage reservoir 2514 may be built like a drawer (e.g., as illustrated in FIG. 28A) and/or by opening the drainage reservoir 2514 one will be able to see how much water has entered the reservoir 2514. For example, the drainage reservoir 2514 may not include a separate level indicator 2512 and/or window. Optionally a retainer (e.g., a wall 2509) retains water on the distributor screen 2504 in place as it slowly percolates through and/or spreads across a growth medium.

Several components of a plant watering system in accordance with an embodiment of the invention in an assembled view, and in FIG. 28B.

Figure 29:
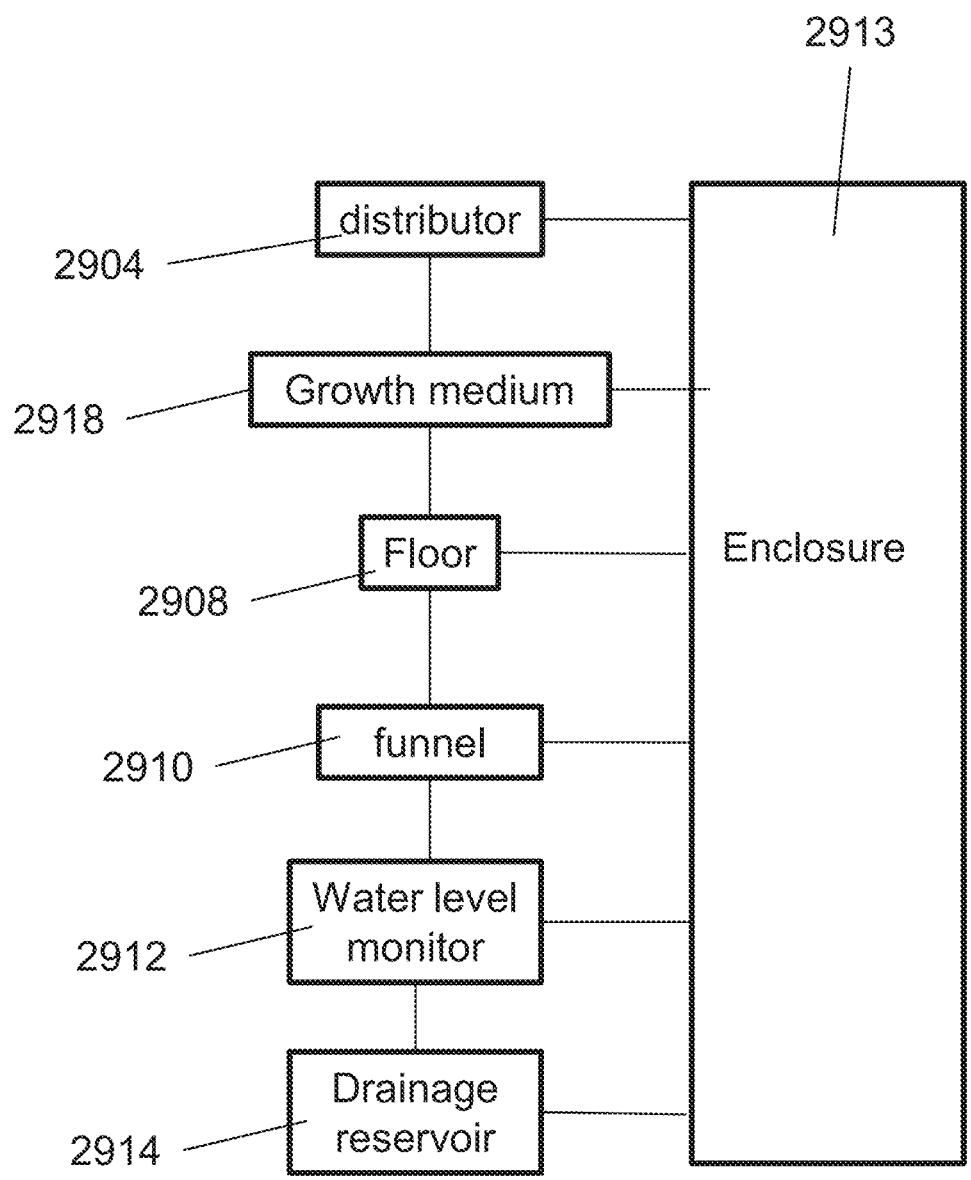
FIG. 29 is a block diagram of a plant watering system in accordance with an embodiment of the current invention.

FIG. 29 is a block diagram illustrating the relationship of several components of the plant watering system in accordance with an embodiment of the invention. For example, the components of the system could include those illustrated in various embodiments herein. In some embodiments, a distributor 2904 is positioned to spread water over the surface of a growth medium 2918. The growth is optionally supported by a floor 2908. The floor is optionally configured to allow water to drain from the growth medium to a funnel 2910. Optionally, the funnel 2910 directs drainage water to a water level monitor 2912 and/or to a reservoir 2914.

Alternatively or additionally, water may drain directly from the floor 2908 to a reservoir 2914 and/or a water level monitor 2912. Optionally, the entire system is connected to and/or held within an enclosure 2913.

Figure 30:
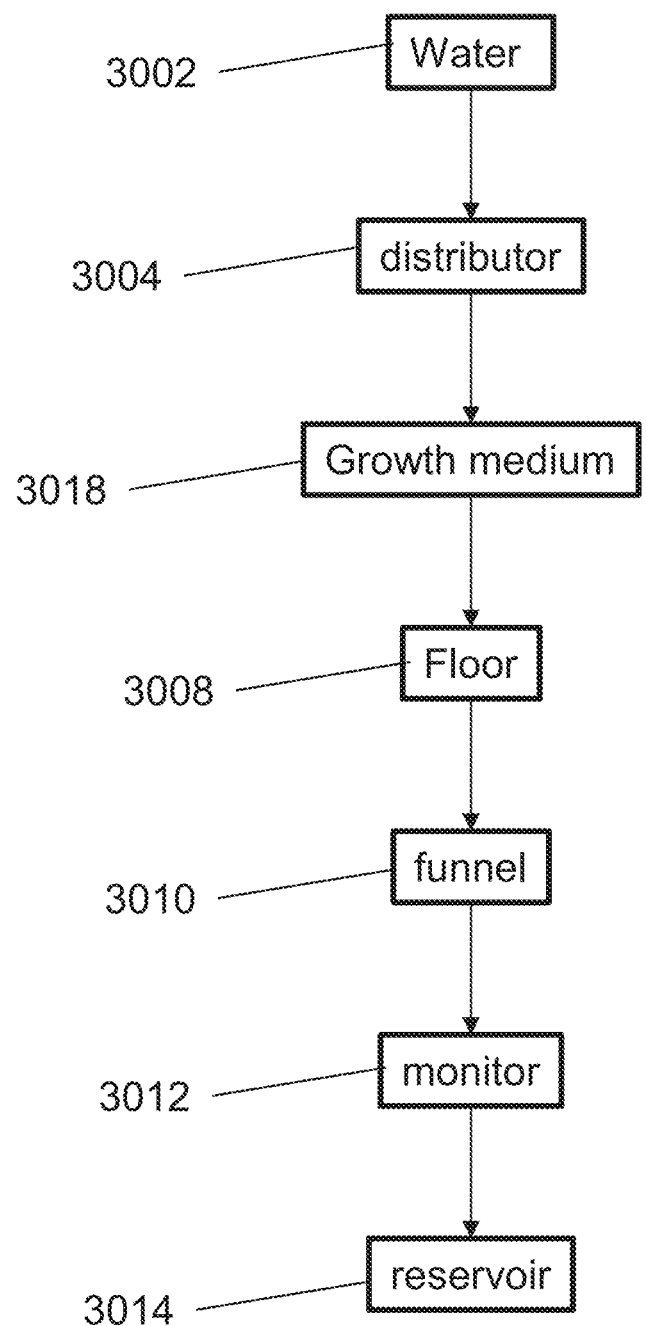
FIG. 30 is a flow diagram of a plant watering system in accordance with an embodiment of the current invention.
Figure 7:
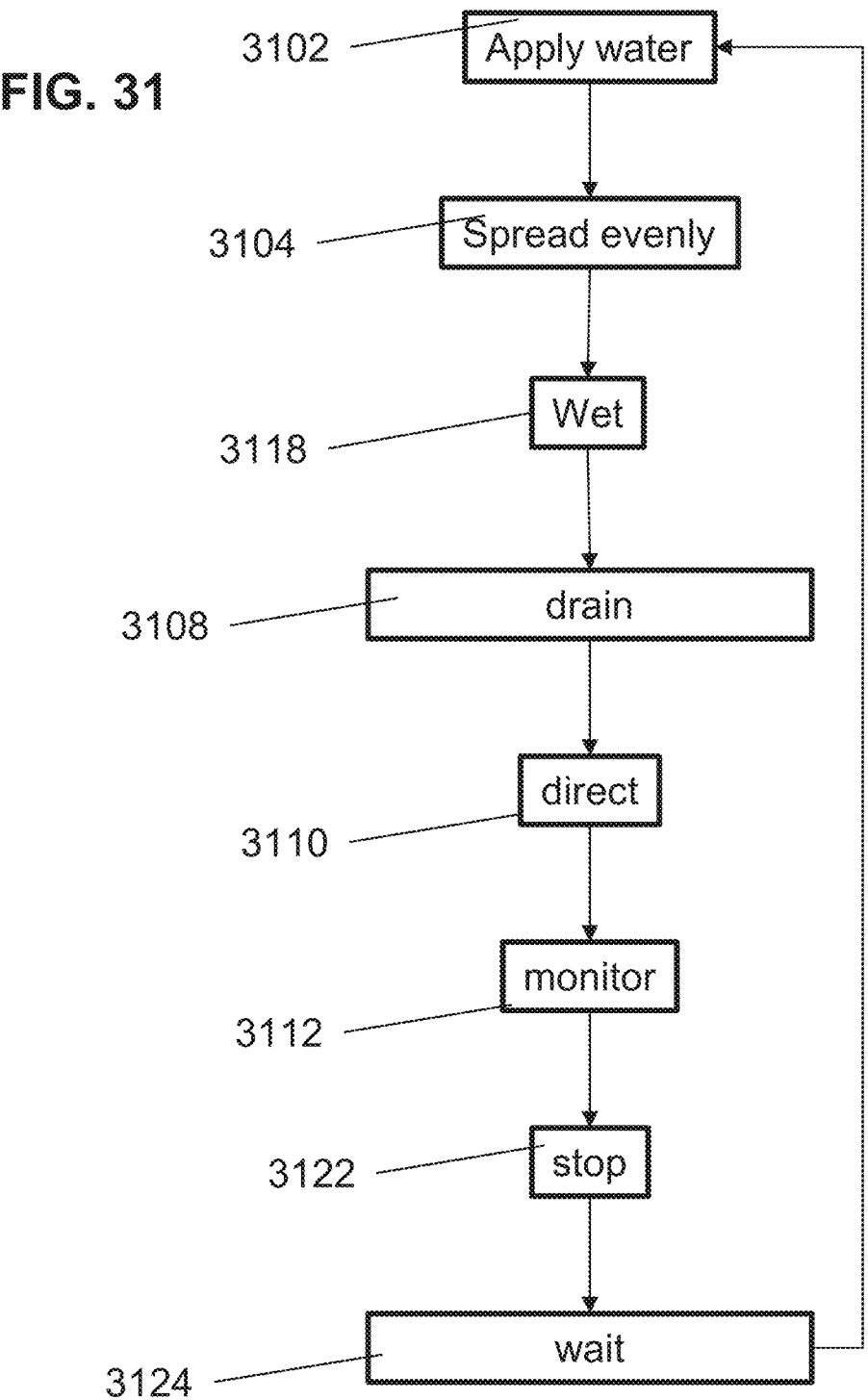

FIG. 30 is a flow diagram which illustrates the passage of water through a plant watering system in accordance with an embodiment of the invention. Water 3002 may be poured onto a distributor 3004, it may then be spread and/or slowly be released through the distributor 3004 over the surface of a growth medium 3018 and/or one or more plants. Water 3002 optionally percolates through the growth medium 3018 and/or through a floor 3008 and/or through a funnel 3010 into a level monitor 3012 and/or a drainage reservoir 3014.

FIG. 31 is a flow diagram which illustrates a method of watering a plant in accordance with an embodiment of the invention. In some embodiments, there are walls around a water distributor and/or around an opening for a plant. For example, the walls may rise between 0 to 1 and/or 1 to 3 and/or 3 to 6 cm above the screen. Optionally, a user may apply water 3102 onto the distributor until it fills and/or partially fills the space between the walls. For example, this may be a way to measure the proper amount of water to apply in the first application. Optionally, the water drips down slowly and/or evenly spread 3104 onto the top of the growth medium and/or wets 3118 the growth medium evenly. Once the growth medium is wet enough (e.g., saturated) water drains 3108 through the growth media. The draining 3108 water is optionally directed 3110 to a reservoir and/or indicator. Optionally, drainage 3108 is monitored 3112 from the indicator and/or reservoir. For example, when water drains 3108 fast enough, it is a sign that the growth medium is sufficiently wet 3118 and/or saturated and application of water 3102 is stopped 3122. For example, a user may start watering when the medium achieves saturation and/or near saturation and/or when drainage increases rapidly and/or when a volume of drained water reaches of threshold volume). Evapotranspiration optionally dries the growth medium. The caretaker of the system then waits 3124 dependent on the type of plant, the size the plant, the climate, etc. until the next watering. For example, the caretaker may test the soil and apply water 3102 again when the soil is dry and/or wait 3124 a predetermined time etc.

FIG. 32 is a schematic perspective view of a planter in use in accordance with an embodiment of the current invention. In some embodiments. For example, a plant 3224 may have roots 3226 in a growth medium 3218 within the planter and/or grow up through an opening 2505 in a distributor 2504 on top of the planter. In some embodiments, a space 3223 between the floor 2508 of the planter and the overflow reservoir 5214 may allow a user to view the state of water and/or water level in the reservoir.

In some embodiments, when the growth medium 3218 is saturated water drains through the growth medium 3218 and/or floor 2508 onto a funnel 2510 which directs the water into the water level monitor 2512. For example, the water level monitor 3212 may be a small clear vessel (e.g., a cup and/or a vessel with a clear wall). When the water is draining quickly it may quickly fill the cup so that it is more obvious than changes in the drain reservoir 2514 (which is optionally big enough to store overflow and avoid spillage, but may be so big that the drainage from the soil is not obvious immediately). Optionally, the water level monitor 2512 includes a small drainage hole (e.g., on or near the bottom) and/or an overflow channel (e.g., near the top) that drain into the drain reservoir. The drainage hole may slowly drain water for example in order than slow dripping from wet but not saturated growth medium 3218 will not fill the water level monitor 2512. The overflow channel may prevent spillage if the system is overwatered and/or a lot of water enters the water level monitor 2512. Optionally, the cup is clear to see the water level therein. Optionally, the cup also indicates the water level of the reservoir. For example, the cup may be sunk into the reservoir such that as the reservoir water level goes up, the water level in the cup also goes up. Alternatively or additionally, the planter may not include a water level monitor.

In some embodiments, the reservoir may be removable and/or have a drainage hole so that excess water may be removed without needing to move the plant 3224. There may be space 3223 between the bottom of the floor 2508 and the drainage reservoir 2514 for example so that water in the drainage reservoir does not dampen the soil and/or damage the roots of the plant. There may be space between the top of the growth medium 3218 and the distributor 3204. The walls of the planter may be made of any material. Optionally the walls of the planter include air holes for the growth medium 3218 and/or roots 3226 to get air.

For example, a user pours water onto the distributor 3204 above a growth medium 3218 containing roots 3226 of one or more plants 3224 in an enclosure 2513. The distributor 2504 causes the water to slowly and evenly drip over the entire surface of the growth medium 3218. This optionally causes the water to evenly wet the growth medium 3218 until saturation. When the growth medium 3218 is evenly saturated, water will drip through the growth medium 3218 and/or through a floor 2508 e.g., via drainage holes, into a funnel 2510 to a water level monitor 2512 and/or drainage reservoir 2514. Once the growth medium is wet enough (e.g., saturated) and/or water starts draining quickly (e.g., as observed in the monitor 2512 and/or the drainage reservoir 2514) the user stops watering and then waits a set time depending on the plant and/or the amount of water in the drainage reservoir 2514 and/or until the growth medium dries, until the next watering. Optionally, the drainage reservoir 2514 may be removed and emptied. In some embodiments, this results in very consistent soil moisture and plant growth. For example, for dry soil plants, the waiting time between waterings may be longer and/or for wet soil plants the intervals between waterings may be shorter.

Figure 33:
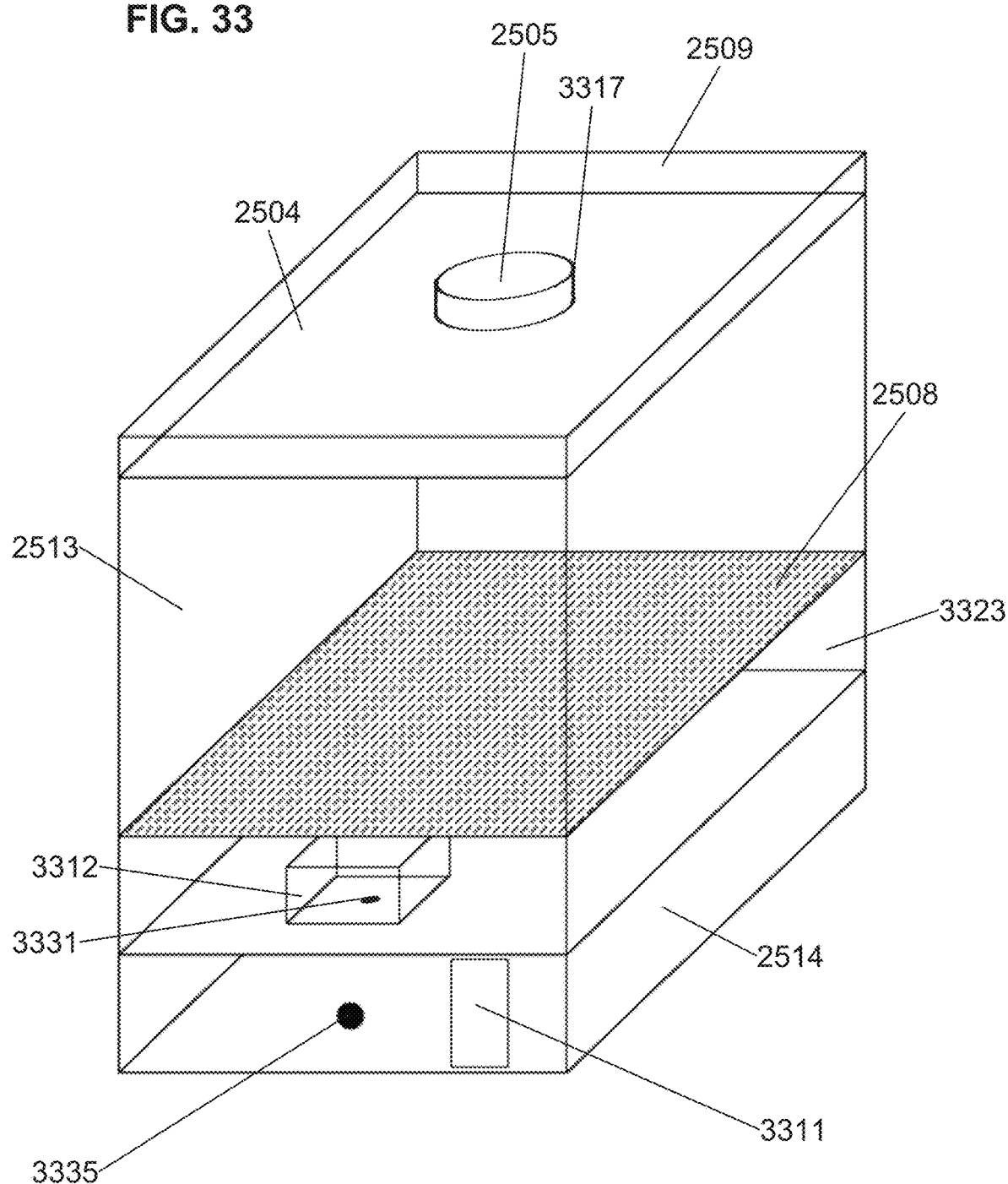
FIG. 33 is a schematic perspective view of a planter in accordance with an embodiment of the current invention.

FIG. 33 is a schematic perspective view of a planter in accordance with an embodiment of the current invention. In some embodiments, a planter will have a separate water level monitor 3311 for the drainage reservoir (for example a window therein) and/or a separate saturation monitor 3312, (for example a cup receiving drip water from the growth medium). Optionally, the saturation monitor 3312 may be suspended above the reservoir 2514 (and/or the water level therein). Optionally water draining from the growth medium is directed to the saturation monitor 3312. For example, the saturation monitor 3312 may have the form of a cup with a hole 3331 for slow water drainage. Optionally the saturation monitor 3312 includes an overflow channel so that if it overflows, the overflow goes onto the drainage reservoir 2514. Optionally the system may have only the reservoir level monitor 3311 and/or only the saturation monitor 3312 and/or neither and/or both. For example, if there is no reservoir level monitor 331, the user may look through a space 3323 between the floor 2508 and the drainage reservoir 2514 to see 1) if the reservoir 2514 is filling (e.g., a sign that the growth medium is saturated) and/or when the reservoir 3314 is getting full. Alternatively or additionally, the user may open the reservoir 2514 (e.g., to check the water level and/or empty the reservoir 2514). For example, the reservoir 2514 may have a handle 335 with which to open the reservoir 2514. For example, the reservoir 2514 may be built in the form of a drawer that can be opened and/or closed, for example using a handle 3335. In some embodiments, the opening 2505 for the plant may have a wall 3317 around it (e.g., to prevent a short circuit of water falling through the opening 2505 rather than passing through the distributor 2504 to the growth medium).

Figure 34:
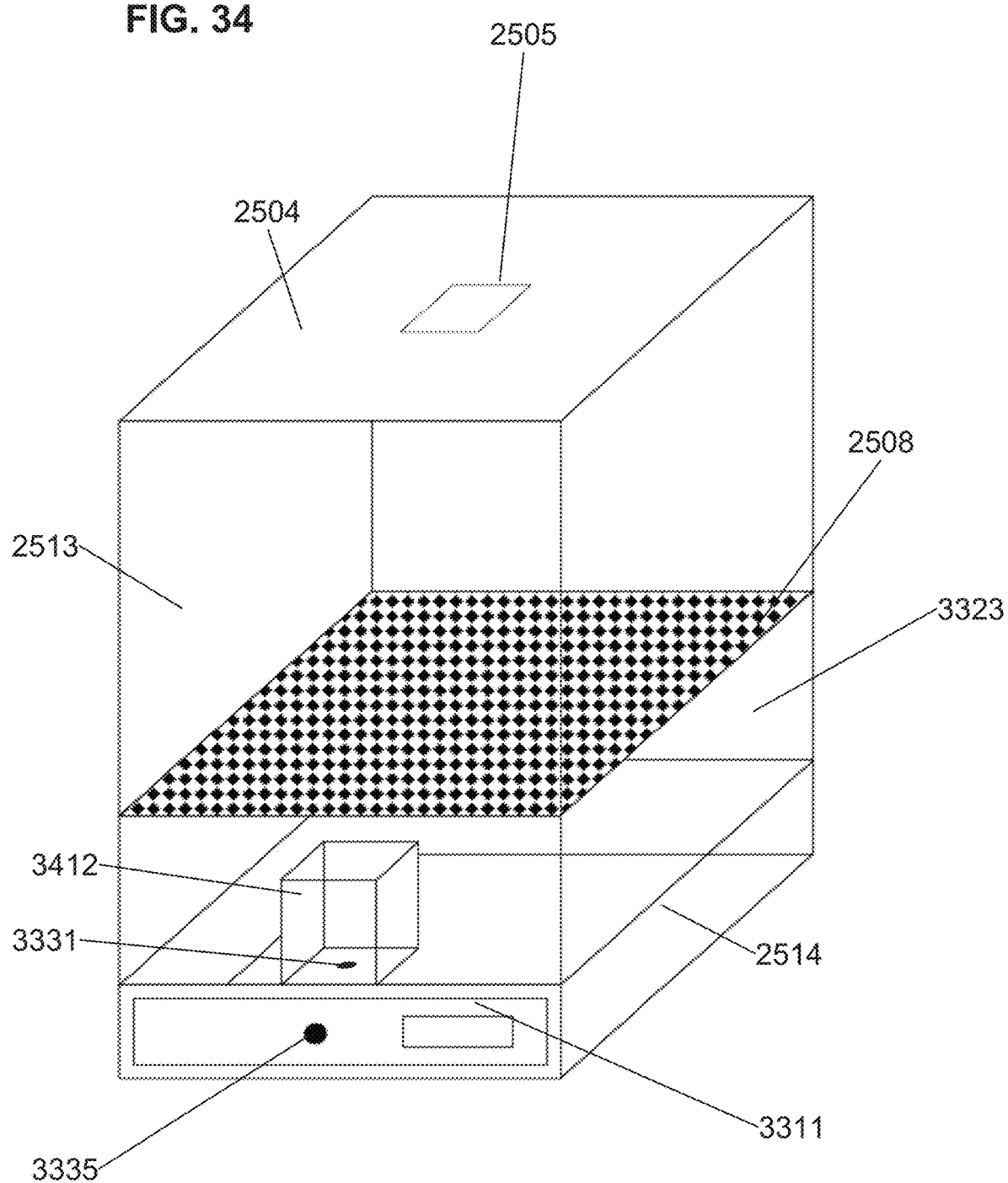
FIG. 34 is a schematic perspective view of a planter in accordance with an embodiment of the current invention.

FIG. 34 is a schematic perspective view of a planter in accordance with an embodiment of the current invention. In some embodiments, a planter will have a separate water level monitor 3311 for the drainage reservoir (for example a window therein) and/or a separate saturation monitor 3412, (for example a cup receiving drip water from the growth medium). Optionally, the saturation monitor 3312 may sit on the bottom of the reservoir 2514 (and/or the water level therein).

These embodiments are provided by way of example and are in no means intended to be limiting the scope of the invention.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

It is expected that during the life of a patent maturing from this application many relevant water dispersion devices will be developed and the scope of the term water dispersion device is intended to include all such new technologies a priori.

As used herein the terms "substantially" "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for saturating a medium comprising:
supplying a vessel having a water distributor located above the medium and further supplying a drainage reservoir and a drainage indicator located below a bottom of the medium;
applying fluid to the water distributor;
distributing, by said distributor, said fluid evenly over an upper surface of said medium over a period of time;
directing drainage water draining out from said bottom of the medium downward into said drainage indicator; and
monitoring a water level in said drainage indicator for an increase in a rate of filling of said indicator indicating an increase in a rate of said draining out of said medium and indicating that the medium has become saturated.

2. The method of claim 1 further comprising:
stopping said watering when said indicator indicates that said medium has reached saturation;
waiting consequent to said stopping; and
reapplying water to the water distributer after said waiting, wherein said waiting is for a predetermined time period.

3. The method of claim 2, wherein a plant is growing in said medium and said predetermined time period is determined by a type of the plant growing in said medium.

4. The method of claim 1, wherein said indicator includes a water storage and a drain hole and wherein said monitoring includes monitoring a water level in said water storage.

5. The method of claim 1, wherein said distributing is by means of a plurality of apertures and regulators for applying water evenly over the upper surface of the medium.

6. The method of claim 5, where each said regulator includes at least one of a torturous path, a maze, protrusions, and a membrane.

7. The method of claim 1, wherein said applying includes pooling water on top of the distributor.

8. The method of claim 1, wherein said drainage reservoir is located below said medium.

9. The method of claim 1, further comprising calculating a fluid capacity of said medium, wherein the fluid capacity is an amount of water applied to said medium minus an amount of drainage water at saturation.

10. The method of claim 1, wherein said monitoring includes viewing a level of water in said drainage reservoir.

11. The method of claim 10, wherein the drainage indicator includes a cup with a transparent portion in a wall thereof and wherein viewing is through the transparent portion.

12. The method of claim 1, further including directing overflow water from the drainage indicator to the drainage reservoir.

13. The method of claim 1, wherein some directing is via a funnel.

\* \* \* \* \*